(12) United States Patent
Kinsella et al.

(10) Patent No.: US 11,565,780 B2
(45) Date of Patent: Jan. 31, 2023

(54) SUBMERSIBLE HABITAT FOR THE REPAIR OF SUBSEA CABLE

(71) Applicant: IRISH SEA CONTRACTORS LIMITED, Enniscorthy (IR)

(72) Inventors: David Kinsella, Enniscorthy (IR); Michael Kinsella, Aberdeenshire (GB)

(73) Assignee: IRISH SEA CONTRACTORS LIMITED

( * ) Notice: Subject to any disclaimer, the term of this patent is extended or adjusted under 35 U.S.C. 154(b) by 220 days.

(21) Appl. No.: 16/645,151

(22) PCT Filed: Sep. 4, 2018

(86) PCT No.: PCT/EP2018/073771
§ 371 (c)(1),
(2) Date: Mar. 6, 2020

(87) PCT Pub. No.: WO2019/048433
PCT Pub. Date: Mar. 14, 2019

(65) Prior Publication Data
US 2020/0377184 A1 Dec. 3, 2020

(30) Foreign Application Priority Data

Sep. 7, 2017 (GB) ...................................... 1714396
Mar. 20, 2018 (GB) ...................................... 1804431

(51) Int. Cl.
*B63C 11/52* (2006.01)
*B63C 11/44* (2006.01)
(Continued)

(52) U.S. Cl.
CPC .............. *B63C 11/52* (2013.01); *B63C 11/44* (2013.01); *H02G 1/10* (2013.01); *H01B 7/14* (2013.01)

(58) Field of Classification Search
CPC ......... B63C 11/40; B63C 11/36; B63C 11/44; B63C 11/52; H02G 1/10
See application file for complete search history.

(56) References Cited

U.S. PATENT DOCUMENTS 3,111,812 A * 11/1963 Clarke ...................... F16L 1/26
405/188
3,328,970 A 7/1967 Giambelluca
(Continued)

FOREIGN PATENT DOCUMENTS

| CN | 1539702 A | 10/2004 |
| CN | 107010186 A | 8/2017 |
| GB | 2145580 A * | 3/1985 ........... G02B 6/3816 |

OTHER PUBLICATIONS

International Search Report and Written Opinion dated Oct. 5, 2018 which was issued in connection with PCT Application No. PCT/EP2018/073771 which was filed on Sep. 4, 2018.

*Primary Examiner* — Andrew Polay
(74) *Attorney, Agent, or Firm* — Buckley, Maschoff & Talwalkar LLC

(57) ABSTRACT

A submersible habitat 100 for the repair of subsea cable 11, the habitat comprising a cable maintenance environment 108 being suitable for receiving a portion of the subsea cable under repair 115 while the subsea cable 11 is submerged. The submersible habitat further comprising raising and/or lowering component 25 configured for raising and/or lowering the submersible habitat 100 relative to the subsea cable 11. The entire repair is carried out within the submersible habitat 100 without the requirement to transport any portion of the subsea cable 11 to the surface.

59 Claims, 19 Drawing Sheets

(51) Int. Cl.
  *H02G 1/10* (2006.01)
  *H01B 7/14* (2006.01)

(56) References Cited

U.S. PATENT DOCUMENTS

| | | | |
|---|---|---|---|
| 3,641,777 A | | 2/1972 | Banjavich et al. |
| 3,968,656 A | * | 7/1976 | Kalinowski ........... E21B 33/037 |
| | | | 166/356 |
| 2019/0027916 A1 | * | 1/2019 | Hemphill ................. H02G 1/10 |

* cited by examiner

SUBMERSIBLE HABITAT FOR THE REPAIR OF SUBSEA CABLE

FIELD OF THE INVENTION

This invention relates to a submersible habitat for the repair of subsea cable, and in particular to submersible habitat wherein the subsea cable is repairable without the requirement to recover any portion of the subsea cable to a surface vessel for repair before returning the repaired subsea cable.

BACKGROUND OF THE INVENTION

Subsea cables are typically utilised to transfer power and/or data between remote locations having a body of water therebetween. It is common practice to lay such cables along the seabed, or bury the cable slightly below the seabed as this removes any requirements for cable supports or the like whilst still providing a relatively secure environment for the cables.

Over time, or due to unforeseen circumstances, cables can become damaged or degraded, resulting in a reduction in capacity or complete failure. These issues can typically be pinpointed to an approximate portion of the cable. However, even if the site of the issue is known, preforming a repair on a subsea cable can be an extremely difficult and time consuming operation.

Currently, the repair of such cables involves recovery of damaged or defective portions of cable to a vessel for repair before returning the repaired cable to the sea bed. This first requires excavation of the cable to expose a length of cable having the damage or defect. The damaged or defective portion is then cut subsea, typically using an ROV or carried out by a diver. Each cut end of the cable is then, in turn, recovered to a vessel and a new section is spliced therebetween to replace the damaged or defective portion. The repaired section is then returned to the seabed.

As can be appreciated, the above involves the recovery of a first cut end, attachment of one end of a new portion of cable to this first cut end, travel to a location where the second cut end can be recovered, recovery of this second cut end, and attachment of a second end of the new portion of cable thereto. This process results in the length of the new portion being dependent on the depth of the subsea cable, and typically the required length can be three times this depth. Consequently, even for a repair where a relatively short damaged or defective portion is cut from the cable, a significant length of new cable is required to carry out the repair. This results in additional expense, and a requirement to store large amounts of cable in order to carry out repairs.

In addition to the length of new cable required, it can be appreciated from the description above that the process as described would be time consuming and labour intensive.

It is the object of the present invention to provide for subsea cable repair within a suitable repair environment without the requirement to recover any portion of the subsea cable to a vessel.

SUMMARY OF THE INVENTION

According to the invention there is provided a submersible habitat for the repair of subsea cable, the habitat comprising a cable maintenance environment suitable for receiving a portion of the subsea cable under repair while the subsea cable is submerged, and the entire repair is carried out within the submersible habitat without the requirement to transport any portion of the subsea cable to the surface, the submersible habitat further comprising raising and/or lowering means configured for raising and/or lowering the submersible habitat relative to the subsea cable.

Ideally, the submersible habit further comprises lateral movement means for adjusting the lateral positioning of the habitat relative to the subsea cable after initial placement of the submersible habitat on the seabed.

Further advantageously, it is not necessary to raise the subsea cable to sea level or above in order to access the cable maintenance environment, resulting in a quicker repair process and disruption to significantly less of the subsea cable during repair.

Ideally, the subsea cable is a subsea power cable.

Preferably, the submersible habitat comprises a lifting mechanism for lifting the portion of the subsea cable received within the cable maintenance environment such that the portion of the subsea cable under repair is raised to a lifted position.

Preferably, the lifting mechanism lifts the subsea cable such that some or all of the portion of the subsea cable under repair is not submerged.

Advantageously, the portion of the subsea cable to be repaired can be accessed and repaired in non-submerged conditions.

Ideally, the habitat comprises subsea cable retaining means arranged to engage with and retain the subsea cable.

Preferably, the subsea cable retaining means are locatable on the lifting mechanism.

Ideally, the subsea cable retaining means comprise at least one retaining element for releasably retaining the subsea cable.

Preferably, the subsea cable retaining means comprises two retaining elements for releasably retaining the subsea cable.

Ideally, the lifting mechanism comprises at least one extensible arm, the extensible arm terminating at a first end in a retaining element.

Preferably, the lifting mechanism comprises two extensible arms, each extensible arm terminating at a first end in a retaining element.

Ideally, the retaining elements are arranged to engage with and retain the subsea cable at two separate retained locations longitudinally along the subsea cable.

Preferably, the portion of subsea cable under repair is disposed between the two separate retained locations.

Ideally, the retaining elements are clamping means configured to releasably clamp the subsea cable.

Ideally, the subsea cable retaining means is arranged to retain the subsea cable such that upon cutting of the subsea cable, the subsea cable retaining means reduces or prevents axial spreading of the cut portion or portions of the subsea cable.

Advantageously, the prevention of axial spreading minimises further damage to the subsea cable and as such prevents additional repairs or longer sections of repair than is necessitated by the original defect or damage of the subsea cable.

Ideally, the lifting mechanism and the subsea cable retaining means in combination are configured to grab the subsea cable from its position on the seabed, raise the subsea cable into the lifted position, and retain the subsea cable in the lifted position such that a repair can be carried out.

Advantageously, retaining and lifting the cable can be carried out by a single mechanism.

Ideally, the cable maintenance environment is at least partially enclosed by an enclosure.

Preferably, the enclosure is suitable for housing at least one human inhabitant and at least the portion of subsea cable under repair.

Most preferably, the enclosure is suitable for housing at least two human inhabitants and at least the portion of subsea cable under repair.

Ideally, the submersible habitat comprises location adjustment means in operable engagement with the enclosure and arranged to adjust the location of the enclosure and/or lifting mechanism relative to the subsea cable.

Preferably, the location adjustment means allows for adjustment of the location of the enclosure relative to the subsea cable after initial placement of the habitat on a seabed such that the subsea cable is locatable within the enclosure and is accessible within the cable maintenance environment.

Ideally, the location adjustment means is arranged to adjust the location of the enclosure after the submersible habitat has been placed on an area of seabed proximal the subsea cable, the placement being laterally and/or longitudinally offset from the subsea cable or a site of subsea cable repair.

Advantageously, the location adjustment means allows for a less critical initial placement of the habitat as, should the habitat not be placed exactly such that the subsea cable is alignable with, or within the cable maintenance environment, the habitat can thereafter be adjusted such that the subsea cable is alignable with or within the cable maintenance environment, and a subsequent repair can then be carried out.

Further advantageously, the habitat requires less manipulation from a vessel after initial placement.

Preferably, the location adjustment means comprises raising and/or lowering means.

Ideally, the raising and/or lowering means is arranged to adjust the location of the enclosure such that the enclosure is raisable into an elevated position relative to the subsea cable.

Preferably, the raising and/or lowering means is arranged to adjust the location of the enclosure such that the enclosure is lowerable from an elevated position relative to the subsea cable to a position on or proximal the subsea cable.

Ideally, the location adjustment means comprises the lateral movement means.

Preferably, the lateral movement means is arranged to adjust the location of the enclosure such that the enclosure is moveable laterally relative to the subsea cable.

Ideally, the raising and/or lowering means and the lateral movement means are operable independently in sequence, or concurrently in combination, to raise the enclosure into an elevated position relative to the subsea cable, laterally position the enclosure such that at least a portion of the enclosure is locatable directly above at least a portion of the subsea cable, and lower the enclosure such that at least a portion of the subsea cable may be locatable within the cable maintenance environment.

Preferably, the raising and/or lowering means comprises a plurality of extensible supports in operable engagement with the enclosure and arranged to selectably raise or lower the enclosure relative to the subsea cable.

Ideally, the raising and/or lowering means comprises at least one opposing set of extensible supports locatable on each side of the enclosure and operably engagable with the enclosure such that extension or retraction of the extensible supports raises or lowers the enclosure.

Preferably, the raising and/or lowering means comprises two opposing sets of extensible supports locatable on each side of the enclosure and operably engagable with the enclosure such that extension or retraction of the extensible supports raises or lowers the enclosure.

Preferably, the extensible supports terminate in a footing means.

Ideally, the footing means is configurable to prevalent soil conditions.

Preferably, the footing means comprises a modular system configurable to prevalent soil conditions.

Ideally, the footing means comprises a pad.

Advantageously, the pad inhibits the habitat from sinking into the material of the seabed.

Ideally, the extensible support(s) are locatable laterally on each side of the subsea cable upon initial placement of the submersible habitat.

Ideally, the extensible support(s) comprise hydraulic struts.

Preferably, the lateral movement means comprises at least one enclosure guide means in operable engagement with the enclosure to guide the lateral movement of the enclosure.

Ideally, the enclosure guide means extends generally perpendicular to the longitudinal direction of the subsea cable.

Preferably, the enclosure guide means extends between opposing raising and/or lowering means.

Ideally, the lateral movement means comprises a means for conveying the enclosure along the at least one enclosure guide means.

Most preferably, the lateral movement means comprises two enclosure guide means, one extending between each set of opposable raising/lowering means.

Ideally, each enclosure guide means is in operable engagement with a subsea cable facing outer face of the enclosure.

Preferably, the enclosure guide means is at least one track, the enclosure having track engagement means for slidable or other such movable engagement with the at least one track such that the enclosure is movable along the at least one track.

Ideally, the enclosure is movable along the at least one track generally in the longitudinal direction of the at least one track.

Preferably, the means for conveying the enclosure is a hydraulic actuation means or other such suitable actuation means.

Ideally, the location adjustment means comprises longitudinal movement means.

Preferably, the longitudinal movement means comprises one or more continuous track, wheels, a thruster system, or other such means arranged to convey the submersible habitat in the longitudinal direction of the subsea cable.

Most preferably, the longitudinal movement means comprises two continuous tracks.

Ideally, the enclosure comprises cable access means.

Preferably, the enclosure has opposable cable access walls through which the cable is passable.

Ideally, the cable access means comprise apertures in the cable access walls of the enclosure, the subsea cable being locatable in the apertures.

Preferably, the apertures of the cable access means are elongated apertures.

Ideally, the apertures of the cable access means extend from the bottommost edge of the opposable cable access walls in a generally vertical direction part way along the cable access walls.

Ideally, the elongated apertures are configured to permit at least partial vertical movement of the subsea cable.

Preferably, the cable access means comprise channels which extend outwards from the apertures of the cable access means generally along the axial direction of the subsea cable.

Ideally, the channels are sealably attachable around at least a portion of the apertures of the cable access means.

Preferably, the channels are tapered channels.

Ideally, the tapered channels have a first end with generally the same cross-sectional dimensions as at least an upper portion of the elongated openings.

Preferably, the tapered channels have a bottom edge which opposes the seabed when in use and extends generally parallel to the seabed.

Ideally, the tapered channels have a top face which tapers along the axial length of the channel to meet the bottom edge.

Preferably, the bottom faces of the channels are open such that the subsea cable is locatable within the channels.

Advantageously, water does not enter the apertures of the cable access means.

Further advantageously, the channels of the cable access means allow the water level in the enclosure to be at a lower level than the uppermost portion of the apertures of the cable access means and, resultantly, lower than the subsea cable when it is located at the uppermost portion of the cable access means. Thus the subsea cable can be in a non-submerged condition within the enclosure.

Preferably, the cable access means comprise skirt portions formed from a portion of the cable access walls.

Alternatively, the cable access means are provided with seal means configured to form a sealable relationship between the enclosure and the subsea cable when the subsea cable is located within the cable access means.

Ideally, the seal means are adjustable seal means.

Preferably, the seal means comprise a seal bracket locatable on the cable access means and a seal member operably engagable with the seal bracket to form a seal therebetween.

Preferably, the seal means are configured such that they may be quickly deployed to form a seal around the subsea cable.

Ideally, once the submersible habit is placed on the seabed with extensible supports located on each side of the subsea cable, the raising and/or lowering means and the lateral movement means are operable independently in sequence, or concurrently in combination to effect final positioning of the submersible habitat which includes laterally positioning the enclosure such that the cable access means are located directly above the subsea cable, and lowering the enclosure such that the subsea cable enters the sealing brackets of the cable access means.

Ideally, external cable retention components are locatable outside the enclosure.

Preferably, the external cable retention components are alignable with the cable access means, each cable access means having an external cable retention component alignable therewith.

Ideally, the location of the external cable retention components is such that when the subsea cable is located within the sealing brackets of the cable access means, the external cable retention components can retain the subsea cable.

Preferably, once the location of the enclosure has been adjusted such that the subsea cable is within the sealing brackets and the external cable retention components have retained the subsea cable, one or more operatives located within the habitat will deploy the seal members such that a sealed relationship is formed between the subsea cable and the enclosure.

Preferably, the external cable retention components are in close proximity to the cable access means and associated seal means.

Advantageously, as the subsea cable is held by the external cable retention components in close proximity to the seal means, movement of the subsea cable in the vicinity of the seal means is minimised thus enhancing the integrity of the seal means.

Ideally, internal cable retention components are provided internally of the enclosure.

Preferably, the internal cable retention components are locatable proximal the cable access means.

Advantageously, the subsea cable can be retained internally at a location proximal the cable access means such that movement of the subsea cable internally of the enclosure during repair of the subsea cable does not affect the integrity of the seal means.

Ideally, the external cable retention components are external cable clamps.

Preferably, the internal cable retention components are internal cable clamps.

Preferably, the enclosure comprises four side walls and a roof portion connecting the four side walls.

Ideally, the bottom portion of the enclosure opposing the roof portion is an open portion.

Preferably, the enclosure comprises an entrance chamber.

Ideally, the entrance chamber comprises a sealable first door or hatch for providing access to the interior of the entrance chamber from external of the submersible habitat.

Preferably, the entrance chamber comprises a sealable second door or hatch for providing access from the entrance chamber to the cable maintenance environment of the enclosure.

Preferably, the entrance chamber comprises means for pressurisation.

Ideally, the means for pressurisation comprises a compressed or forced air supply.

Advantageously, the entrance chamber

Ideally, the second sealable door or hatch is provided by an existing entrance door or hatch of the enclosure.

Ideally, the entrance chamber is a modular entrance chamber.

Preferably, the entrance chamber is attachable to the enclosure via a sealable bolted flange.

Advantageously, operatives may enter the sealable first door or hatch, seal the sealable first door or hatch, and remove their diving equipment before entering the cable maintenance environment of the enclosure through the sealable second door or hatch thus providing a quick and safe method for ingress and egress of the cable maintenance environment of the enclosure.

Preferably, at least a portion of at least the enclosure of the submersible habitat is formed from a modular construction.

Ideally, the modular construction comprises modular sections joinable to form an enclosure of the desired dimensions.

Preferably, the enclosure is extendible by the addition of modular sections such that its longitudinal length can be adapted.

Advantageously, the enclosure may be formed such that its longitudinal length accommodates varying lengths of subsea cable to be repaired.

Further advantageously, even for longer cable repairs the repair may be carried out entirely within the enclosure, with no requirement to transport any portion of the cable to the surface.

Ideally, each modular section is sized such that it extends the enclosure longitudinally by approximately 1 meter.

Preferably, the modular sections have a generally square cross section having dimensions of approximately 2 meters by 2 meters.

Ideally, the modular sections are attachable between any existing portion of the enclosure and the entrance chamber.

Preferably, the modular sections are attachable to either end of the enclosure.

Preferably, the enclosure is in fluid communication with the water, via the open bottom portion, when the submersible habitat is submerged.

Ideally, the enclosure has pressurisation means operable to create an air pocket within the cable maintenance environment.

Preferably, the pressurisation means is operable to evacuate water from, or prevent water from entering, the open portion of the enclosure.

Ideally, the pressurisation means forces air/gas into the enclosure.

Preferably, the pressurisation means forms a water line within the enclosure having water therebelow and air/gas thereabove.

Ideally, the water line is below the lifted position of the subsea cable.

Ideally, the pressurisation means has a differential pressure control means which is configured to maintain the pressure within the enclosure.

Advantageously, the water level within the enclosure remains at a desired level either during the descent to the seabed, or whilst positioned on or about the seabed.

Ideally, the pressurisation means comprises a gas/air supply, or a gas/air tank.

Preferably, the submersible habitat comprises ballast means.

Advantageously, the ballast means is configured to counteract the buoyancy of the submersible habitat due to the air pocket located therein.

Ideally, the ballast means comprises ballast blocks.

Preferably, the ballast blocks are locatable either side of the submersible habitat.

Advantageously, the ballast is balanced, maintaining the submersible habitat at a level pitch within the water.

Ideally, the ballast is locatable in ballast cradles on each side of the submersible habitat.

Preferably, the ballast is adjustable ballast capable of counteracting any required level of buoyancy.

Ideally, the submersible habitat comprises cable rollers which are configured to guide and/or support the subsea cable.

Preferably, at least one cable roller is insertable beneath the subsea cable when the subsea cable is located within the cable maintenance environment, the at least one cable roller retaining the subsea cable at a work level sufficient for joint preparation.

Ideally, the raising and/or lowering means comprises leg arrangements comprising an extensible leg component having a lower ground engaging member.

Preferably, the leg arrangements further comprise an upper member which is fixably attached to a side wall of the submersible habitat, the lower ground engaging member and upper member being movable relative to each other.

Ideally, at least one actuator is operable between the lower ground engaging member and upper member and configured to effect relative movement therebetween by raising the upper member.

Preferably, the lower ground engaging member and the upper member are hollow members defining hollow internal spaces.

Ideally, the leg arrangements further comprise a leg guide fixably attached to the side wall of the submersible habitat and configured to guide the relative movement between the lower ground engaging member and upper member.

Preferably, the ballast is located in ballast pigs, the ballast pigs being locatable within the leg arrangements.

Ideally, the ballast is located within the hollow internal space of the lower ground engaging member.

According to the invention there is provided a method of repairing a cable, the method comprising;

i. locating a portion of the subsea cable under repair over a cable maintenance environment while the subsea cable is submerged;

ii. adjusting the height of the cable maintenance environment; and iii. lifting the portion of the subsea cable such that the portion of the subsea cable under repair is raised to a lifted position within the cable maintenance environment.

Ideally, the subsea cable is cut by a diver or remotely operated vehicle prior to the raising of the subsea cable.

Advantageously, it is not necessary to raise the subsea cable to sea level or above in order to access the cable maintenance environment, resulting in a quicker repair process and disruption to significantly less of the subsea cable during repair.

Preferably, the method comprising retaining of the subsea cable prior to cutting of the subsea cable such that axial spreading of the subsea cable does not occur during or after cutting.

Ideally, the method comprising initial placement of the submersible habitat at or about a portion of the subsea cable under repair.

Preferably, the method comprising adjusting of the submersible habitat from its initial placement position such that it is positioned for receiving a portion of the subsea cable under repair.

Advantageously, the adjustment allows for a more flexible and less critical initial placement of the habitat as, should the habitat not be placed exactly such that the subsea cable is alignable with, or within the cable maintenance environment, the habitat can thereafter be adjusted such that the subsea cable is alignable with or within the cable maintenance environment, and a subsequent repair can then be carried out.

Ideally, the method comprising creating a water line within the cable maintenance environment, the water line having air/gas thereabove above and water therebelow, such that the water line is below the lifted position of the subsea cable.

Advantageously, the subsea cable can be in a non-submerged position.

According to the invention there is provided a method of repairing a cable, the method comprising;

i. Locating the submersible habitat such that a cable maintenance environment thereof is located above a portion of subsea cable to be repaired;

ii. adjusting the location of the submersible habitat such that the portion of subsea cable to be repaired may be locatable within the cable maintenance environment;

iii. retaining the cable;

iv. forming a seal between the subsea cable and the submersible habitat;

v. repairing the cable; and vi. releasing the cable back to the seabed.

Ideally, the method further comprises excavating the seabed around at least the portion of subsea cable to be repaired.

Preferably, the method further comprising levelling the seabed at least at the intended point of placement of the submersible habitat thereon.

DETAILED DESCRIPTION OF THE DRAWINGS

The present teaching will now be described with reference to an exemplary submersible habitat for the repair of a subsea cable. It will be understood that the exemplary submersible habitat is provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching.

Figure 5:
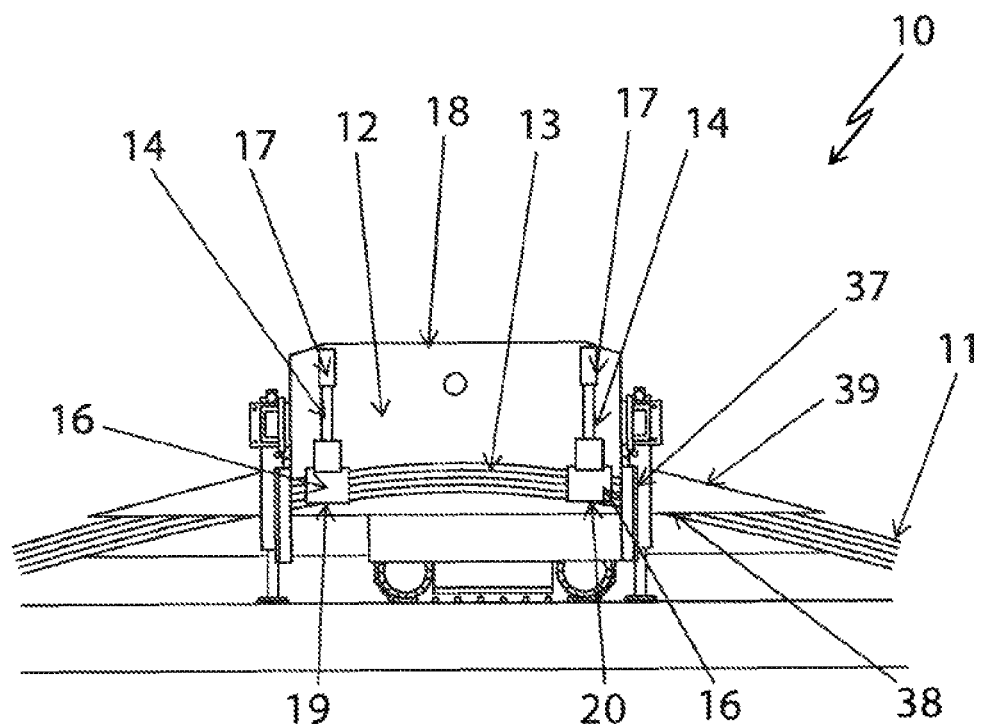
FIG. 5 is a side sectional view of a submersible habitat for the repair of subsea cable according to the present invention, illustrating the location of the subsea cable and the water line.
Figure 6:
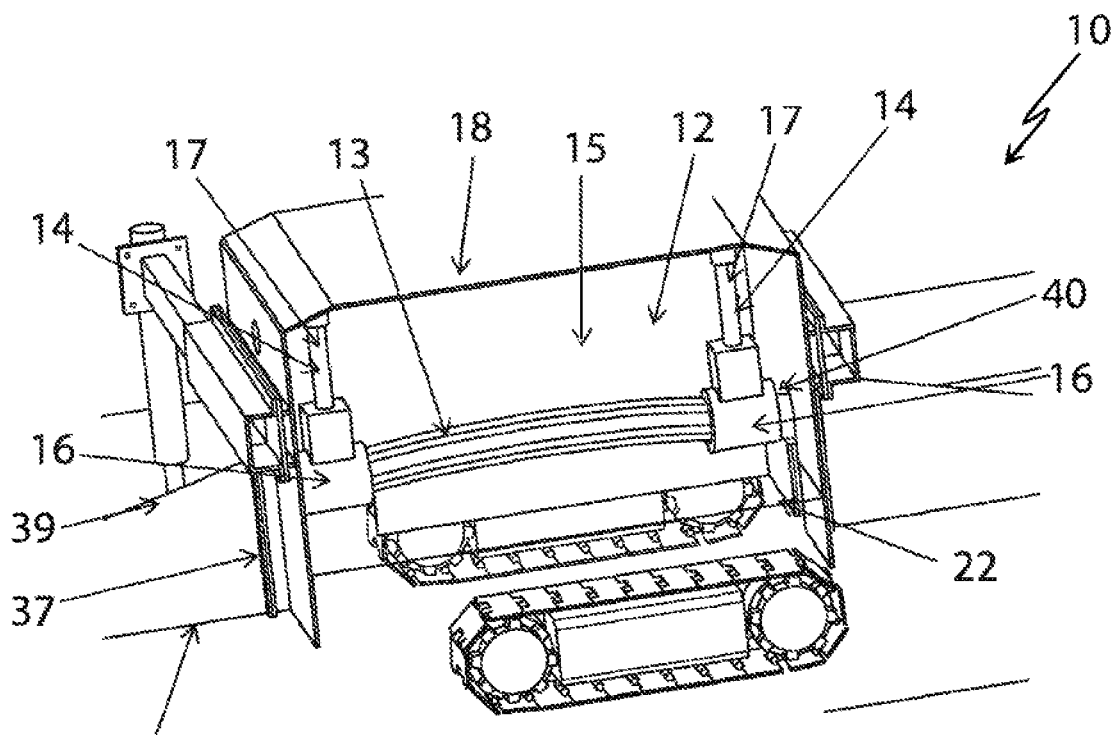
FIG. 6 is a perspective sectional view of a submersible habitat for the repair of subsea cable according to the present invention, illustrating the location of the subsea cable and the water line.

Referring now to the accompanying drawings, there is illustrated a first embodiment of a submersible habitat 10 for the repair of a subsea cable 11. In the embodiment of the drawings, the subsea cable 11 is a subsea power cable 11. The habitat has a cable maintenance environment 12, which receives a portion of the subsea cable under repair 13 while the subsea cable 11 is submerged. The habitat has a lifting mechanism 14 for lifting the portion of the subsea cable 13 received within the cable maintenance environment 12 such that the portion of the subsea cable under repair is raised to a lifted position as best illustrated in FIGS. 5 and 6. In the preferred case, the subsea cable is cut by a diver or remotely operated vehicle (ROV) prior to lifting of the portion of subsea cable under repair 13 into the cable maintenance environment 12. In addition, it is not necessary to raise the subsea cable 11 to sea level or above in order to access the cable maintenance environment 12, resulting in a quicker repair process and disruption to significantly less of the subsea cable 11 during repair.

The lifting mechanism 14 lifts the subsea cable 11 such that some or all of the portion of the subsea cable under repair 13 is located within an air pocket 15 formed within the cable maintenance environment 12. Therefore, the portion of the subsea cable to be repaired 13 can be accessed and repaired in non-submerged conditions as best illustrated in FIGS. 5 and 6.

The habitat has cable retaining clamps 16 for releasable clamping of the subsea cable 11. The cable retaining clamps 16 are located on the lifting mechanism 14. The lifting mechanism 14 has two extensible arms 17, each extensible arm 17 terminating at a first end in a cable retaining clamp 16. The extensible arm is attached at its other end, distal from the end having the clamp, to an enclosure 18 which defines the cable maintenance environment 12. The cable retaining clamps 16 are arranged to engage with and retain the subsea cable at two separate clamping locations 19, 20 longitudinally along the subsea cable so that the portion of subsea cable under repair 13 is disposed between the two separate clamping locations 19, 20. Consequently, as the subsea cable 11 is partially or fully cut during repair, the cable retaining clamps 16 reduce or prevent axial spreading or spring-back of the cut portion of the subsea cable. The prevention of this axial spreading or spring-back minimises further damage to the subsea cable 11 and as such prevents additional repairs or longer sections of repair than is necessitated by the original defect or damage of the subsea cable 11.

In use, the lifting mechanism 14 lowers the cable retaining clamps 16 to the portion of seabed 21 on which the subsea cable 11 lies. The cable retaining clamps 16 then clamp the subsea cable and raise it from its position on the seabed 21. The subsea cable 11 is raised into the lifted position above the water line 22, and retained in the lifted position such that a repair can be carried out in the air pocket 15 which is a substantially water free environment. Typically, the subsea cable 11 will be buried beneath the seabed 21 and prior to placement of the habitat 10 the seabed 21 will be excavated to expose a further layer of seabed 23 and uncover the subsea cable 11. As a result of the interconnected nature of the lifting mechanism 14 and the cable retaining clamps 16, the lifting and clamping of the cable 11 is carried out by a single mechanism. The cable maintenance environment 12 is partially enclosed by the enclosure 18. The enclosure 18 is sized such that it can comfortably house at least one human inhabitant along with the portion of subsea cable under repair 13, and still provide sufficient space within which to work and carry out repairs. The skilled person would understand that, whilst retaining clamps are herein described, any suitable generally known retaining elements such as slings, chains, or any other such retaining elements may be utilised, The submersible habitat 10 has a location adjustment arrangement 24 in operable engagement with the enclosure 18 which can adjust the location of the enclosure 18 and its attached lifting mechanism 14 relative to the subsea cable 11. The location adjustment arrangement 24 allows for adjustment of the location of the enclosure 18 relative to the subsea cable 11 after initial placement of the habitat 10 on a seabed 21 such that after adjustment the subsea cable 11 is located within the enclosure 18 and is accessible within the cable maintenance environment 12. Therefore, the initial placement of the habitat 10 may be laterally and longitudinally offset from the portion of the subsea cable under repair 13 but the location adjustment arrangement 24 can adjust the location of the enclosure 18 to ensure that the portion of the subsea cable under repair 13 is received into the cable maintenance environment 12. The location adjustment arrangement 24 therefore allows a more flexible and less critical initial placement of the habitat 10 as, should the habitat 10 not be placed exactly such that the subsea cable 11 is aligned with, or within the cable maintenance environment 12, the habitat 10 can thereafter be adjusted such that the subsea cable 11 is aligned with or within the cable maintenance environment 12, and a subsequent repair can then be carried out. In addition, as the location adjustment arrangement 24 is integral of the habitat 10, this adjustment can be carried out without direct manipulation from the sea level, for example manipulation via cables etc. extending from a vessel.

The location adjustment arrangement 24 has three main components which can adjust the enclosure 18 vertically, laterally, and longitudinally respectively in relation to the subsea cable 11. The raising and lowering component 25 adjusts the location of the enclosure 18 such that the enclosure is raised into an elevated position relative to the subsea cable 11. Similarly, the raising and lowering component 25 adjusts the location of the enclosure 18 such that the enclosure 18 is lowered from this elevated position relative to the subsea cable 11 to a position proximal the seabed 21. The raising and lowering component 25 has two sets of two extensible hydraulic struts 26, one set being on each side of the enclosure 18. Each set of struts 26 is opposing and located in line with a cable access wall 27 of the enclosure 18, and are joined by an enclosure guide 28 which spans from the top of one strut in a set to the top of the other strut in a set. The enclosure guide 28 is movably connected to the enclosure 18 between the two struts 26.

Figure 10:
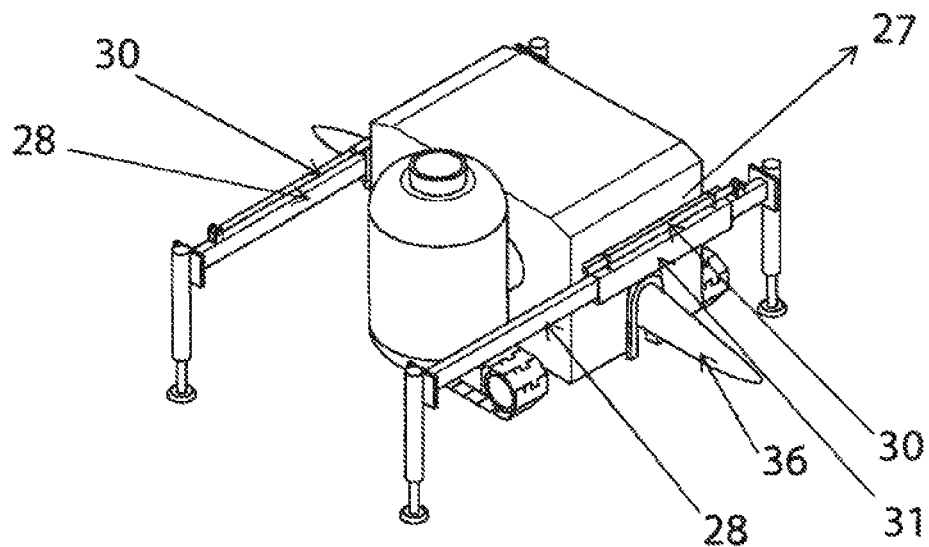
FIG. 10 is a perspective view illustrating the submersible habitat being moved to a first extreme lateral position.
Figure 11:
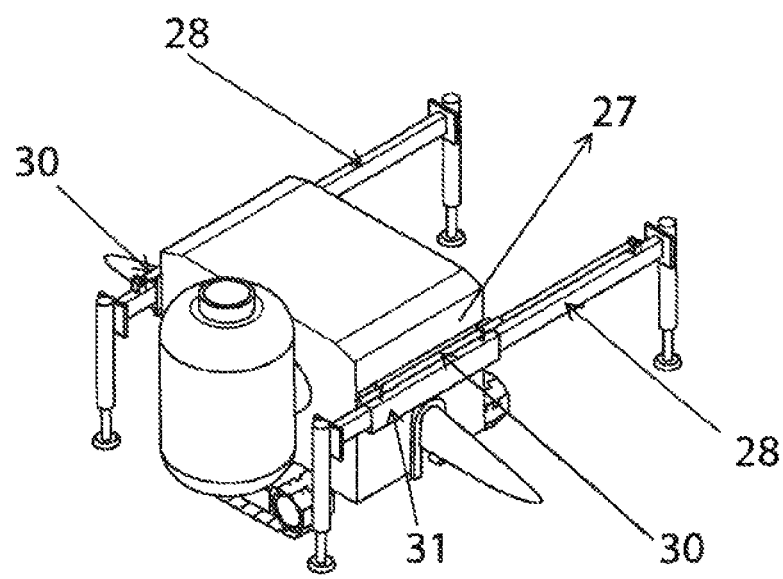
FIG. 11 is a perspective view illustrating the submersible habitat being moved to a second extreme lateral position distal the first extreme lateral position as shown in FIG. 10.

The enclosure guide 28 also forms part of the lateral movement component 29 which adjusts the location of the enclosure 18 such that the enclosure is moveable laterally relative to the subsea cable 11. The enclosure guide 28 extends generally perpendicular to the longitudinal direction of the subsea cable 11 when the cable is located in the cable maintenance environment 12 between opposing sets of struts 26. The lateral movement component 29 has hydraulic actuators 30 for conveying the enclosure 18 along the enclosure guides 28. As can be understood best from FIGS. 10 and 11, there are two enclosure guides 28, one extending between each set of opposing struts 26. The enclosure 18 has guide engagement sleeves 31 for sliding movement along the enclosure guides 28 such that the enclosure 18 is movable along the enclosure guides 28. The hydraulic actuators 30 are operable between the enclosure guides 28 and the guide engagement sleeves 31. A first end of the hydraulic actuator 30 is connected to the enclosure guide 28, the second end of the hydraulic actuator 30 being connected to the guide engagement sleeve 31 such that extension or retraction of the hydraulic actuator 30 causes relative movement between the enclosure guide 28 and the guide engagement sleeve 31. Alternative mechanisms for movable engagement between the enclosure 18 and the enclosure guide 28 may be considered such as a rack and pinion mechanism (not shown) or any other mechanism that would allow for movement of the enclosure 18 longitudinally along the enclosure guide 28. In the embodiment of the drawings, the lateral movement component permits a total of two meters of lateral movement between the sets of opposing struts 26, resulting in one meter of possible movement on either side of the centre of the enclosure guide 28. However, it should be understood that the arrangement as described could easily be adapted to provide any required amount of lateral movement.

In use, the raising and lowering component 25 and the lateral movement component 29 are operated independently in sequence, or concurrently in combination, to raise the enclosure 18 into an elevated position relative to the subsea cable 11. After which the enclosure 18 is laterally positioned such that the enclosure 18 is located directly above the portion of the subsea cable under repair 13. Finally, the enclosure 18 is lowered such that the subsea cable 11 is reachable by the cable retaining clamps 16. The subsea cable 11 is then clamped and raised until the portion of the subsea cable under repair 13 is located within the cable maintenance environment 12, and more specifically within the air pocket 15 within the cable maintenance environment 12.

Figure 1:
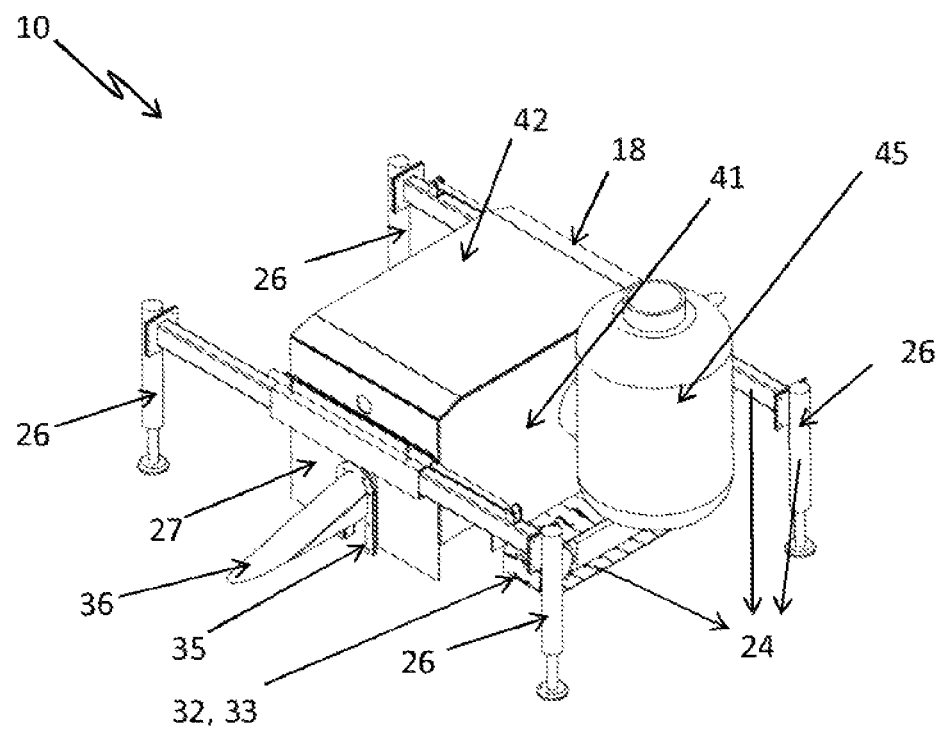
FIG. 1 is a perspective view of a submersible habitat for the repair of subsea cable according to the present invention.
Figure 2:
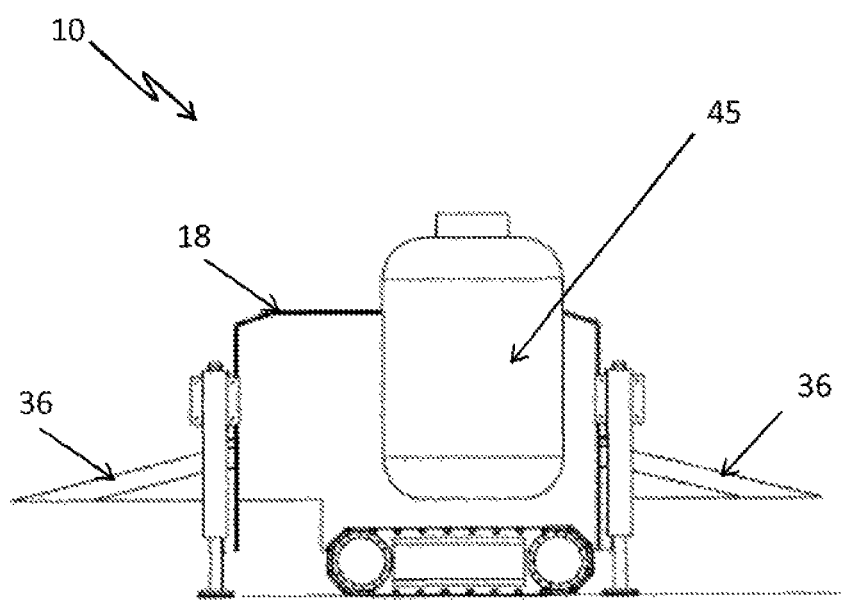
FIG. 2 is a side view of a submersible habitat for the repair of subsea cable according to the present invention.
Figure 3:
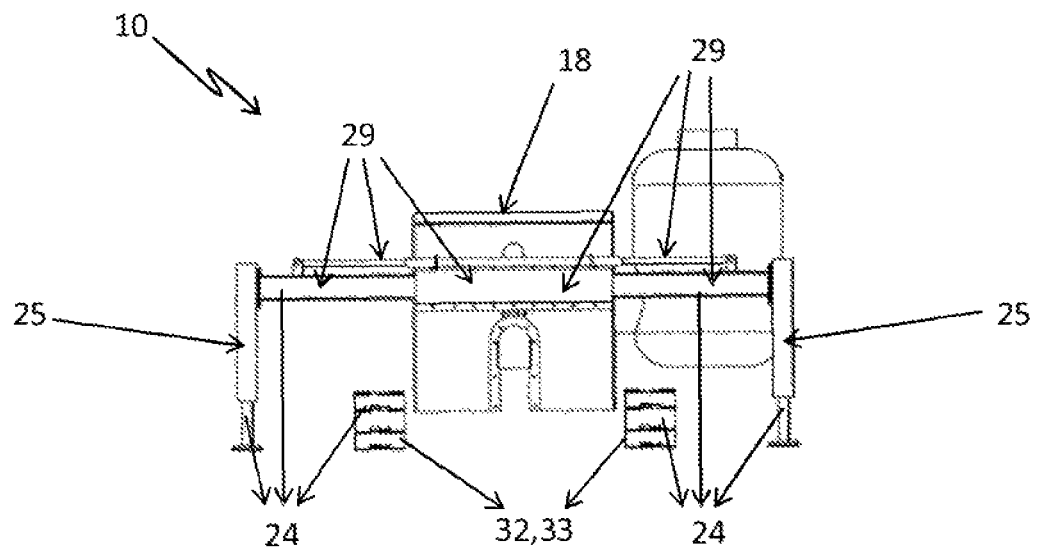
FIG. 3 is a front view of a submersible habitat for the repair of subsea cable according to the present invention.
Figure 4:
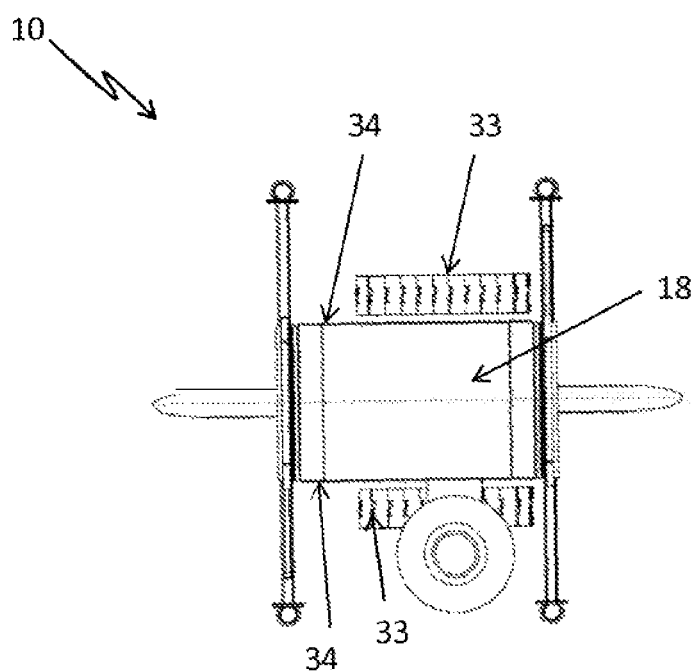
FIG. 4 is a top view of a submersible habitat for the repair of subsea cable according to the present invention.

The location adjustment arrangement 24 also has a longitudinal movement component 32. In the embodiment shown in the drawings, the longitudinal movement component 32 is two continuous tracks 33 arranged to convey the submersible habitat 10 in the longitudinal direction of the subsea cable 11. One continuous track 33 runs along each side 34 of the enclosure 18 as best illustrated in FIG. 4.

Figure 7:
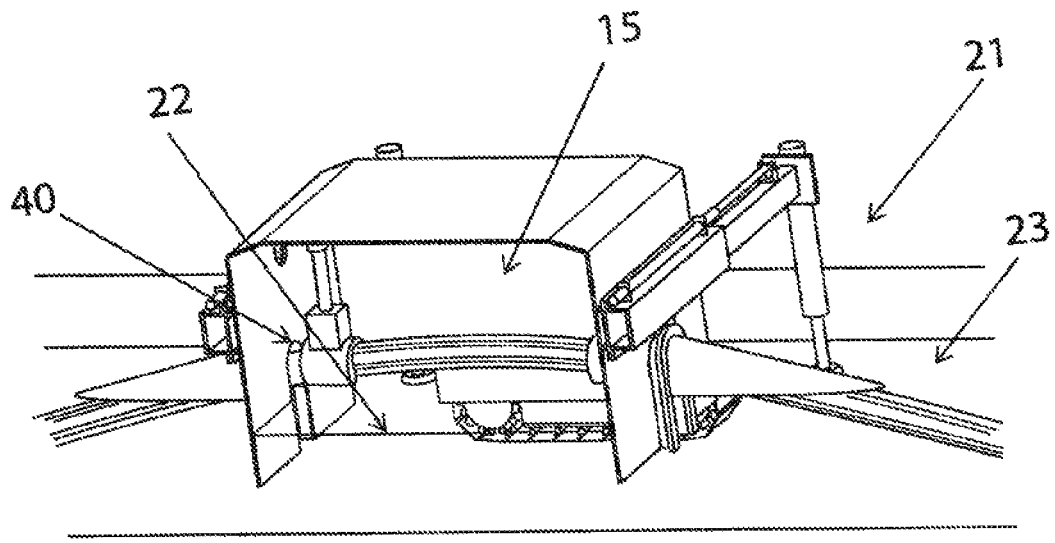
FIG. 7 is a perspective sectional view of a submersible habitat for the repair of subsea cable according to the present invention, illustrating the location of the subsea cable and the water line, and showing the submersible habitat located on a portion of excavated seabed.
Figure 8:
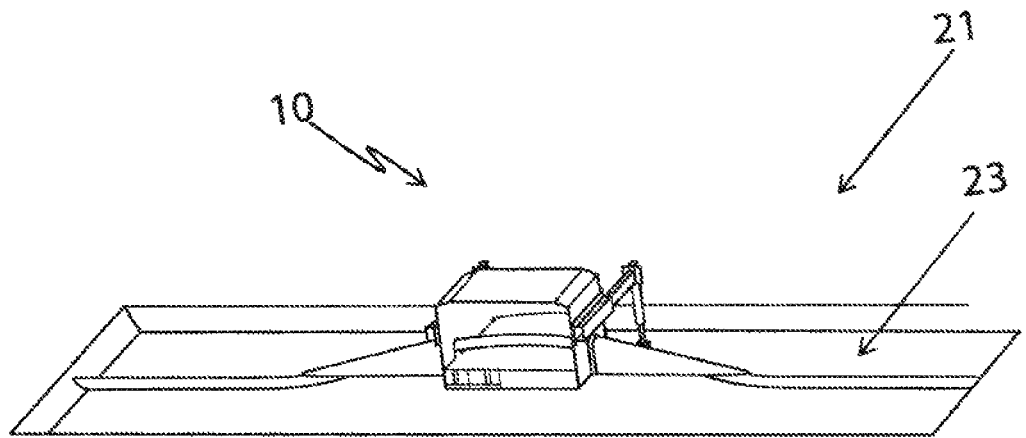
FIG. 8 is a perspective sectional view of a submersible habitat for the repair of subsea cable according to the present invention, illustrating an excavated portion of seabed with the submersible habitat thereon.
Figure 9:
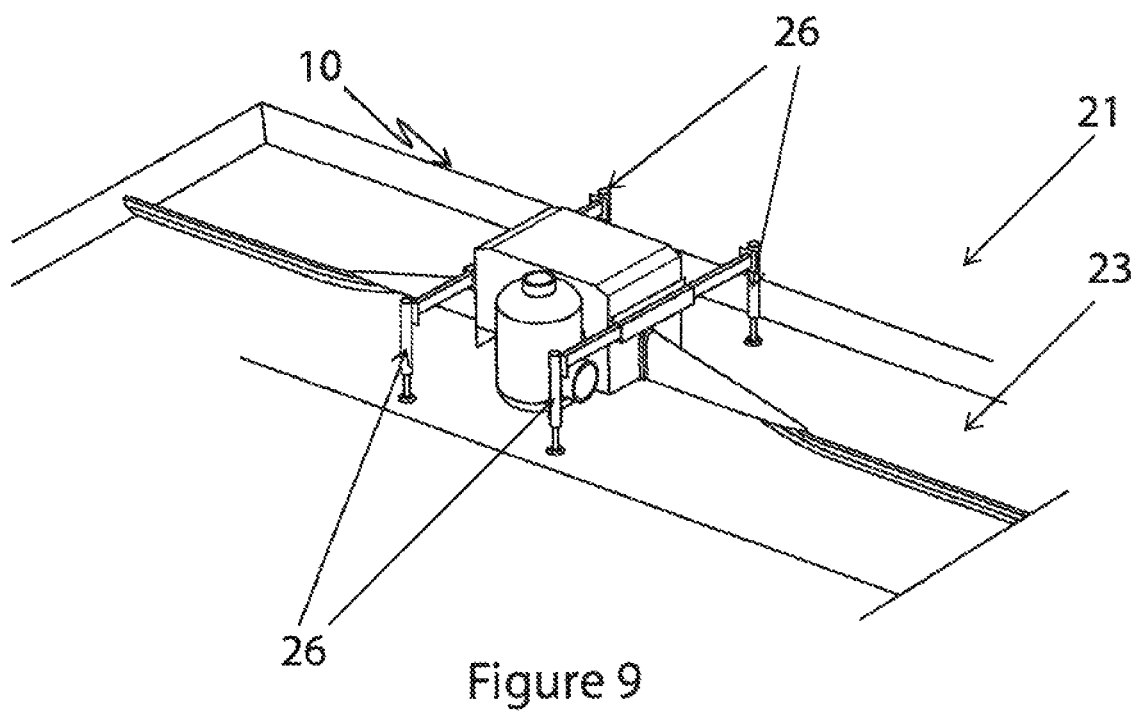
FIG. 9 is a perspective view of a submersible habitat for the repair of subsea cable according to the present invention, illustrating an excavated portion of seabed with the submersible habitat thereon.

The enclosure has opposing cable access walls 27 through which the cable 11 is passable. Apertures 35 in the cable access walls 27 allow the subsea cable 11 to pass from the exterior of the enclosure 18 to the interior. The apertures 35 are elongated apertures which extend from the bottommost edge of both opposing cable access walls 27 in a generally vertical direction part way along the cable access walls 27. As a result of their elongated nature, the apertures 35 are configured to permit a degree of vertical movement of the subsea cable 11 when the subsea cable 11 is located in the apertures 35. The amount of vertical movement of the subsea cable 11 being such that the subsea cable 11 can be raised by the lifting mechanism 14 into a lifted position above the water line 22. Channels 36 are provided which extend outwards from the apertures 35 along the axial direction of the subsea cable 11. The channels 36 are tapered channels which form a sealed attachment around the upper portion of the apertures 35. The channels 36 have a first end 37 with generally the same cross-sectional dimensions as the upper portion of the apertures 35. The channels 36 have a bottom edge 38 which opposes the seabed when in use and extends generally parallel to the seabed 21 and generally perpendicular to the cable access walls 27. The channels 36 have a top face 39 which tapers along the axial length of the channel 36 to meet the bottom edge 38. The bottom faces of the channels 36 are open such that the subsea cable 11 is located within the channels 36 when in use. In an alternative embodiment (not shown) the channels are skirt portions formed from a portion of the cable access walls 27. As the channels 36 extend around the apertures 35 and over the subsea cable 11 creating essentially an extension of the enclosure 18, the water level 22 in the channels 36 can be maintained at the same level as that within the enclosure 18 as best illustrated in FIGS. 6 and 7. This allows the water level 22 in the enclosure 18 to be at a lower level than the uppermost portion 40 of the apertures 35 and, resultantly, lower than the subsea cable 11 when it is located at the uppermost portion 40 of the apertures 35. Thus the subsea cable 11 can be in a non-submerged condition within the enclosure 18.

The enclosure 18 comprises four side walls 27, 41 and a roof portion 42 connecting the four side walls 27, 41. The bottom portion of the enclosure 18 opposing the roof portion 42 is open and in fluid communication with the surrounding water when the submersible habitat 10 is submerged. The enclosure 18 has a pressurisation arrangement (not shown) operational to create the air pocket 15 within the cable maintenance environment 12. The pressurisation arrangement evacuates water from the open portion of the enclosure 18 by forcing air/gas into the enclosure, thus creating the air pocket 15. Alternatively, the pressurisation arrangement (not shown) controls the pressure differential between the interior of the enclosure 18 and the exterior of the enclosure 18 as the habitat 10 descends to the seabed 21. In this case an air pocket 15 existing at sea level can be maintained as the habitat 10 descends. In either case, the pressurisation arrangement forms or maintains a water line 22 within the enclosure 18 having water therebelow and air/gas thereabove, the water line 22 being below the lifted position of the subsea cable 11. The pressurisation arrangement has a differential pressure control system (not shown) which is programmed to maintain the required pressure, and thus the position of the water line 22, within the enclosure 18. The pressurisation arrangement is a canister of compressed gas/air (not shown), an air supply from a pack of J-bottles, or a gas/air feed which may be supplied from a support vessel (not shown). The pressurisation arrangement may also utilise multiple air sources. The skilled person would understand that any generally known means for pressurisation could be utilised.

As a result of the air pocket 15 being created within the enclosure 18, the habitat 10 will acquire a certain level of buoyancy which must be counteracted in order to maintain the habitat 10 in position for a repair. As a result, the habitat 10 has ballast (not shown) to counteract this buoyancy. The ballast comprises ballast blocks (not shown) located either side of the submersible habitat 10 and is balanced, maintaining the submersible habitat 10 at a level pitch within the water. The ballast is retained in ballast cradles (not shown) on each side of the submersible habitat 10.

Figure 12:
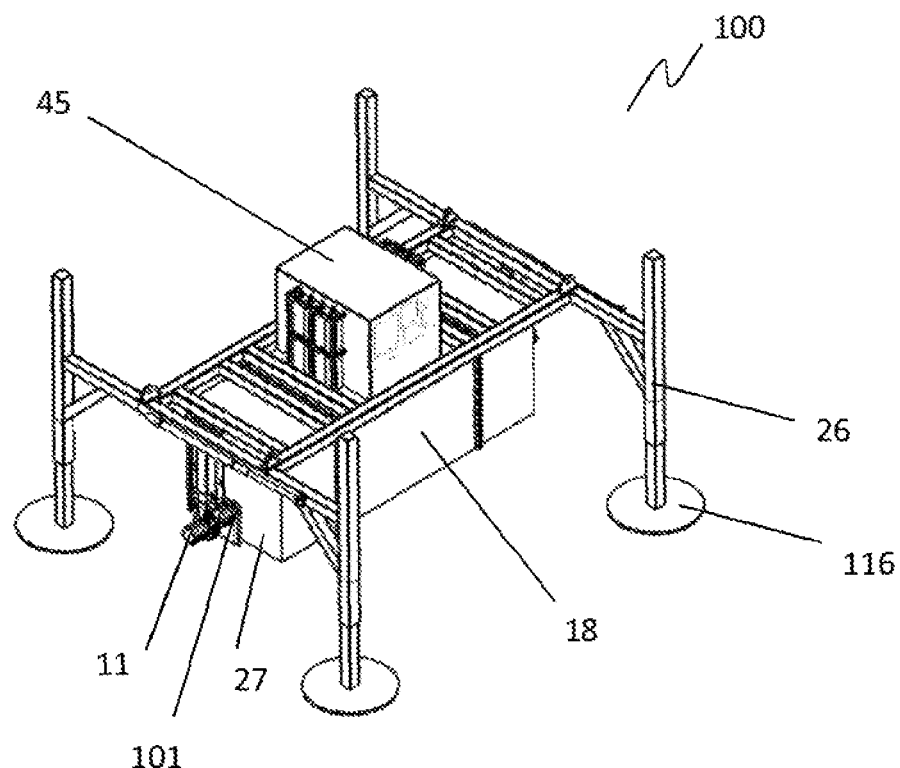
FIG. 12 is a perspective view of a second embodiment of a submersible habitat for the repair of subsea cable.
Figure 13:
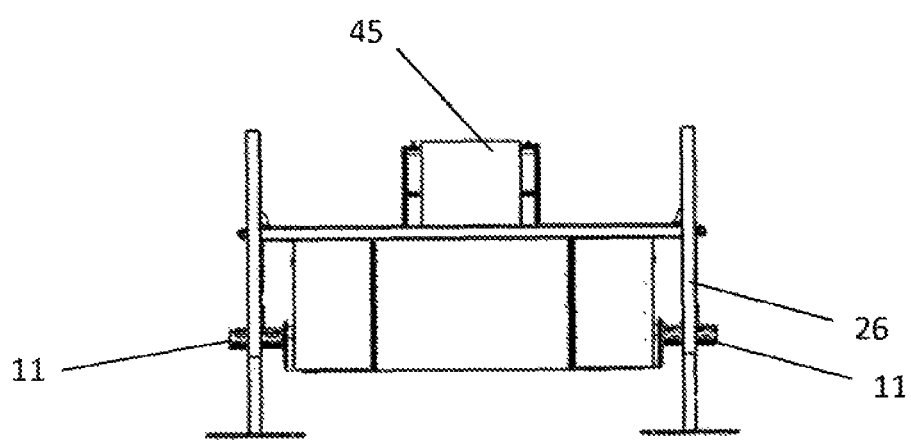
FIG. 13 is a side view of a second embodiment of a submersible habitat for the repair of subsea cable.
Figure 14:
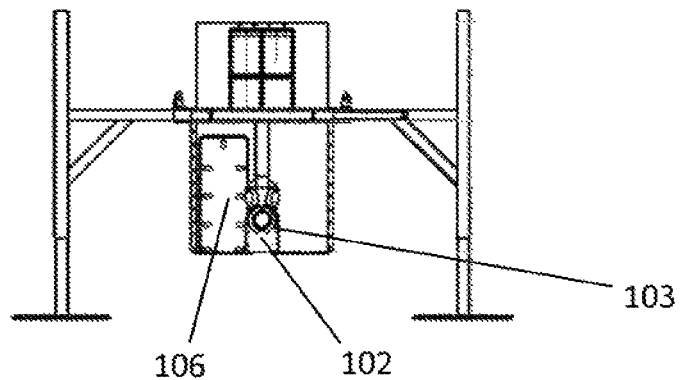
FIG. 14 is a front view of a second embodiment of a submersible habitat for the repair of subsea cable.
Figure 15:
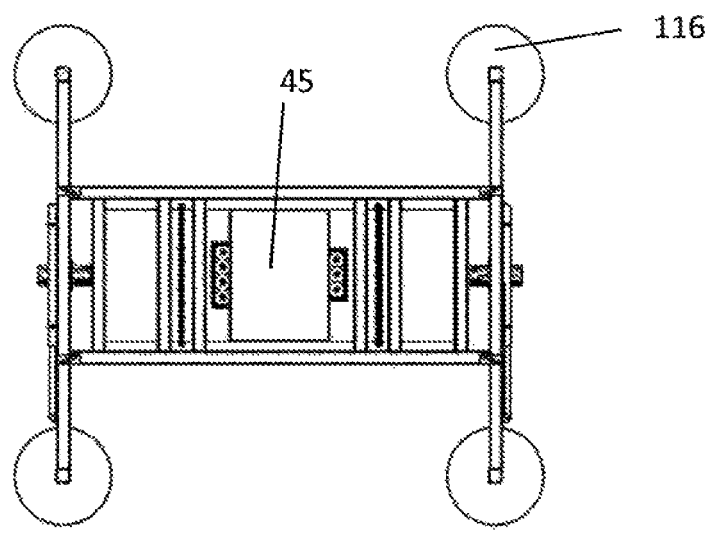
FIG. 15 is a top view of a second embodiment of a submersible habitat for the repair of subsea cable.
Figure 16:
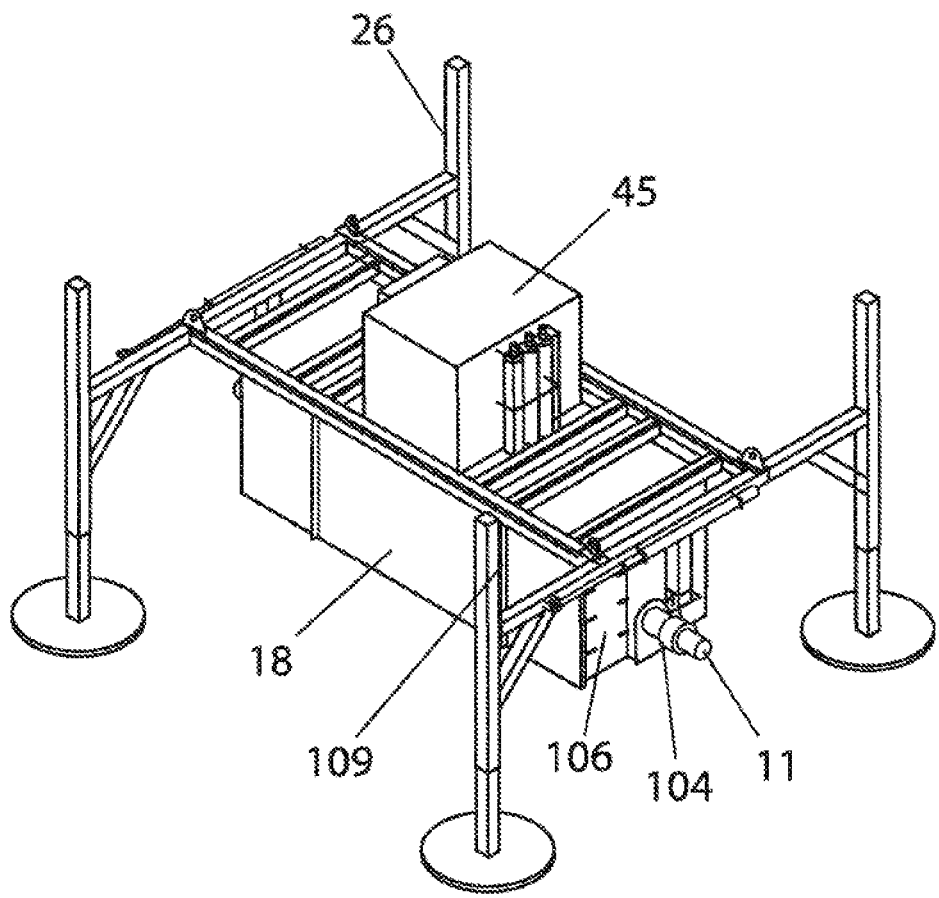
FIG. 16 is a perspective view of a second embodiment of a submersible habitat for the repair of subsea cable.
Figure 17:
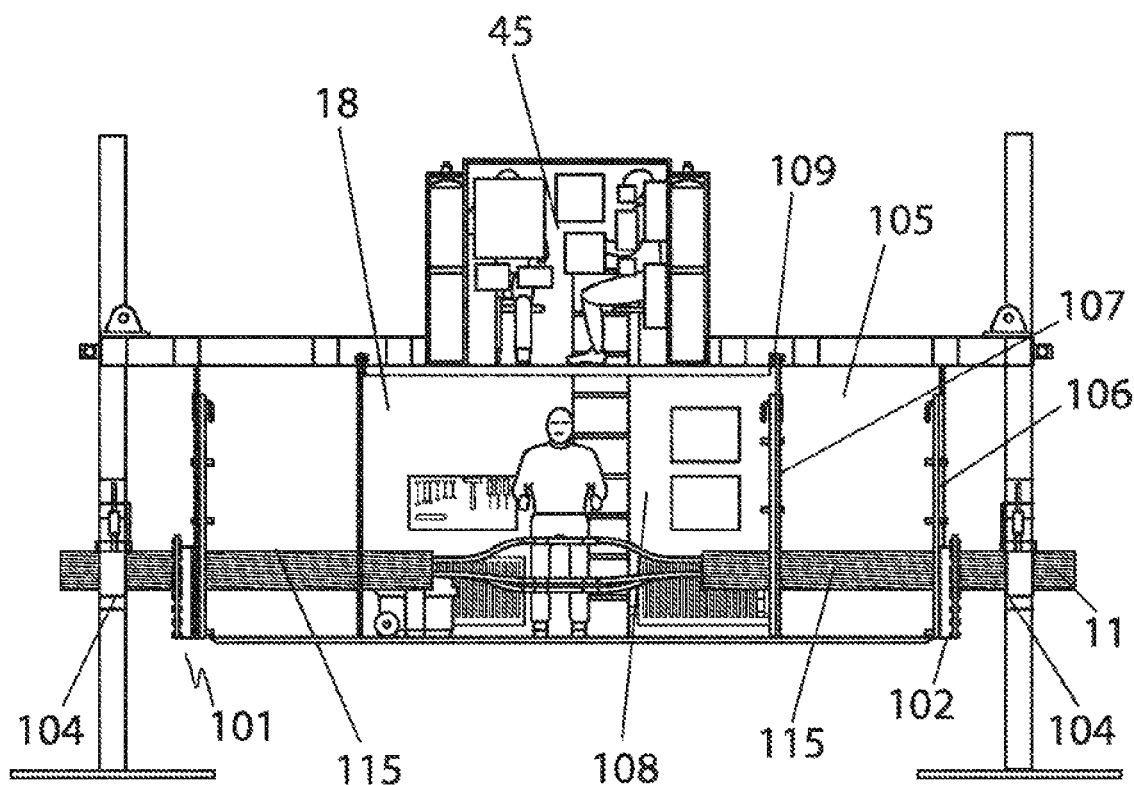
FIG. 17 is a side longitudinal cross-sectional view of a second embodiment of a submersible habitat for the repair of subsea cable showing an operative therein.
Figure 18:
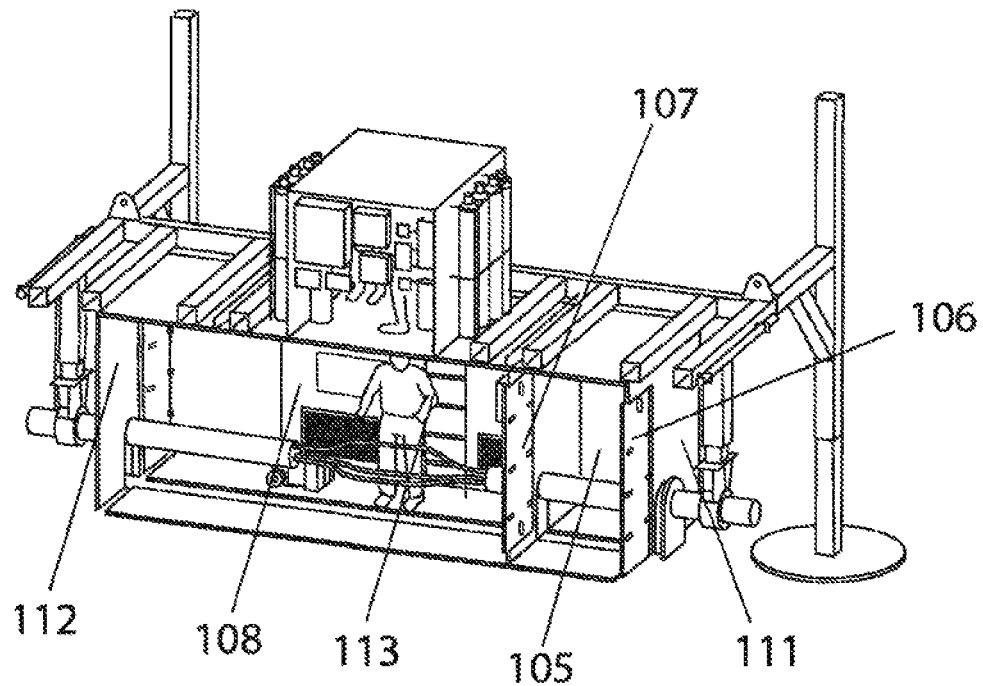
FIG. 18 is a perspective longitudinal cross-sectional view of a second embodiment of a submersible habitat for the repair of subsea cable showing an operative therein.
Figure 19:
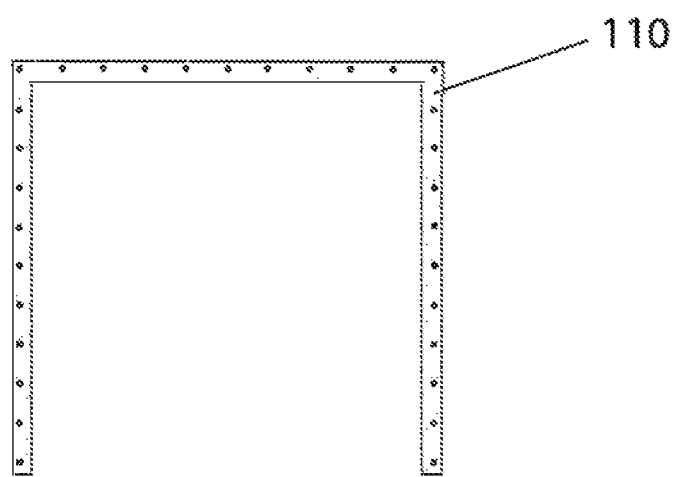
FIG. 19 is a front view of a modular section of a submersible habitat for the repair of subsea cable.
Figure 20:
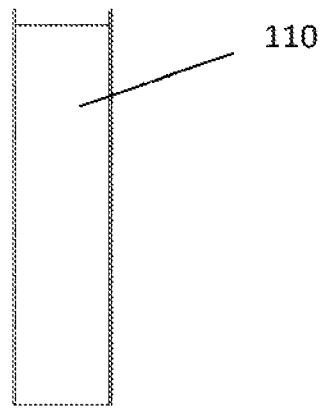
FIG. 20 is a side view of a modular section of a submersible habitat for the repair of subsea cable.
Figure 21:
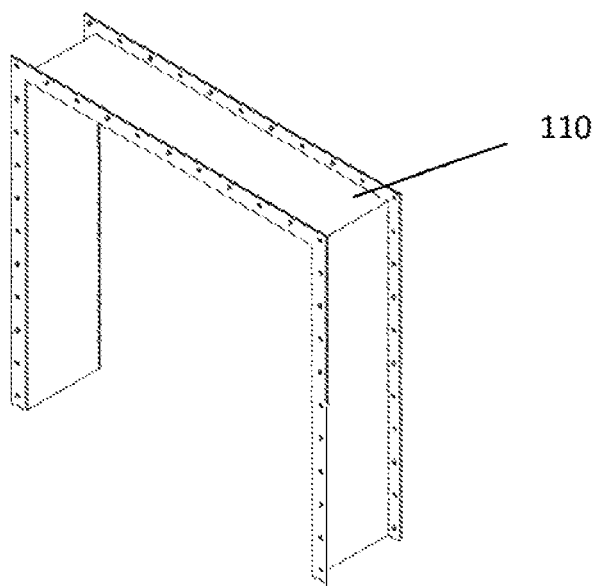
FIG. 21 is a perspective view of a modular section of a submersible habitat for the repair of subsea cable.
Figure 22:
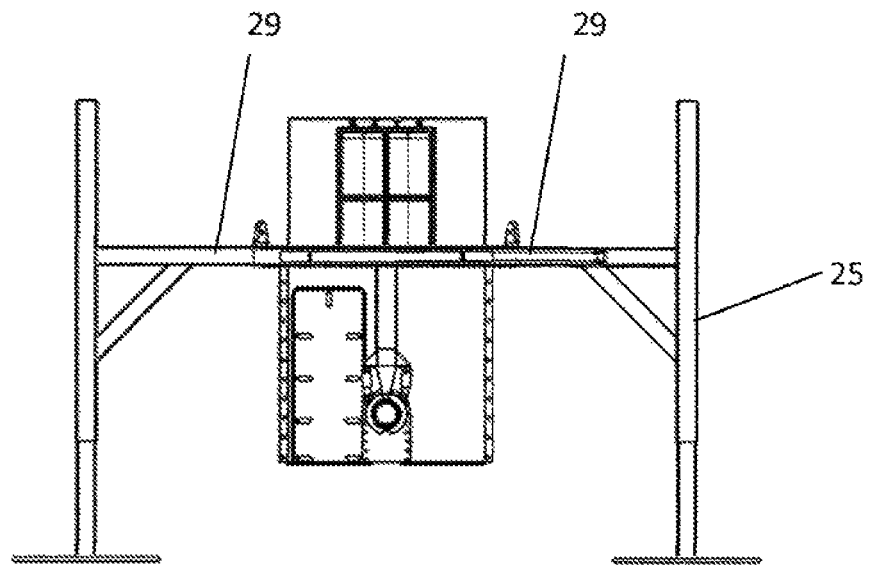
FIG. 22 is a front view illustrating a second embodiment of a submersible habitat located in a central position.
Figure 23:
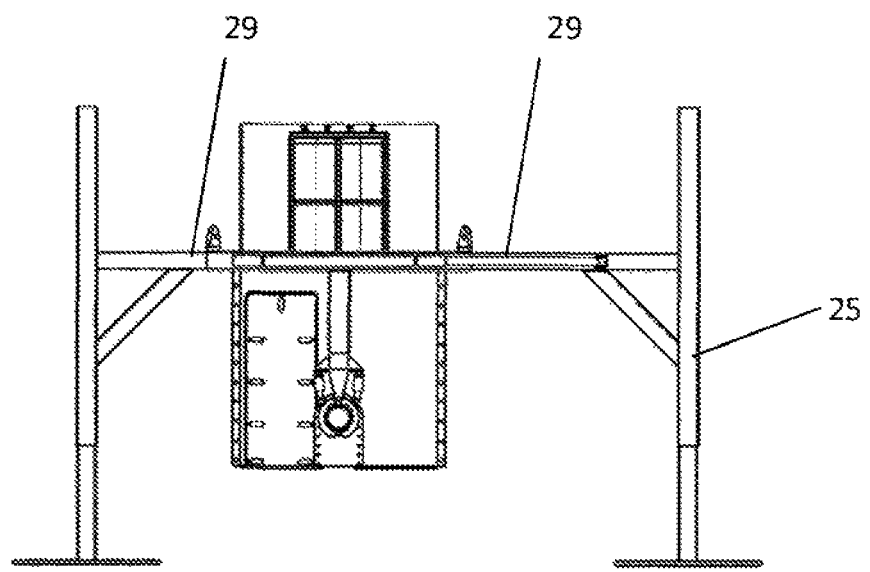
FIG. 23 is a front view illustrating a second embodiment of a submersible habitat being moved to a first extreme lateral position.
Figure 24:
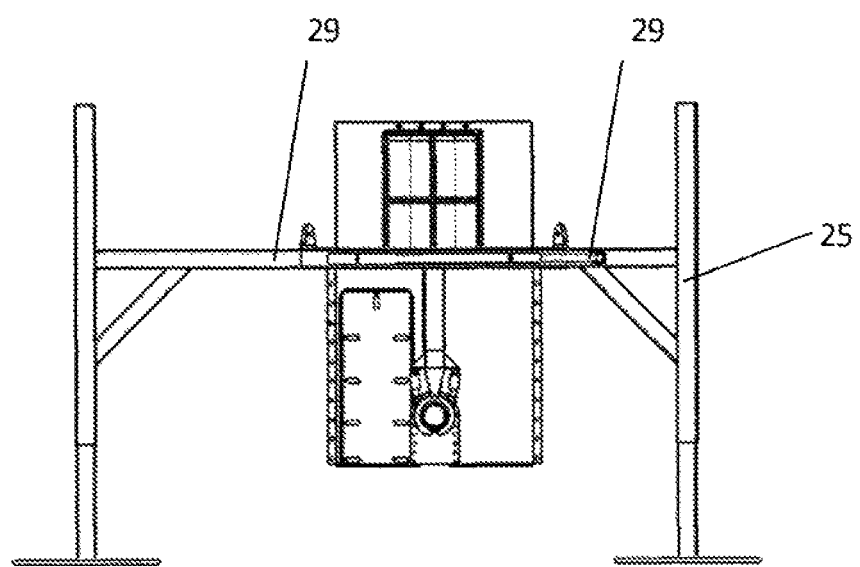
FIG. 24 is a front view illustrating a second embodiment of a submersible habitat being moved to a second extreme lateral position distal the first extreme lateral position as shown in FIG. 23.
Figure 25:
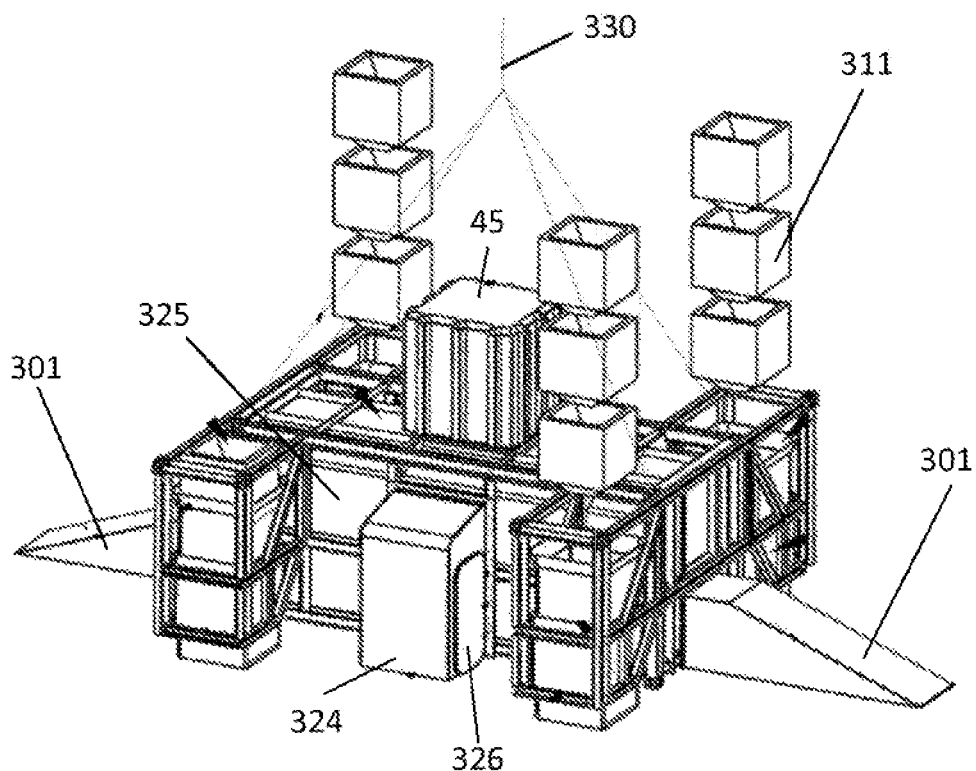
FIG. 25 is a perspective view of a third embodiment of a submersible habitat for the repair of subsea cable.
Figure 26:
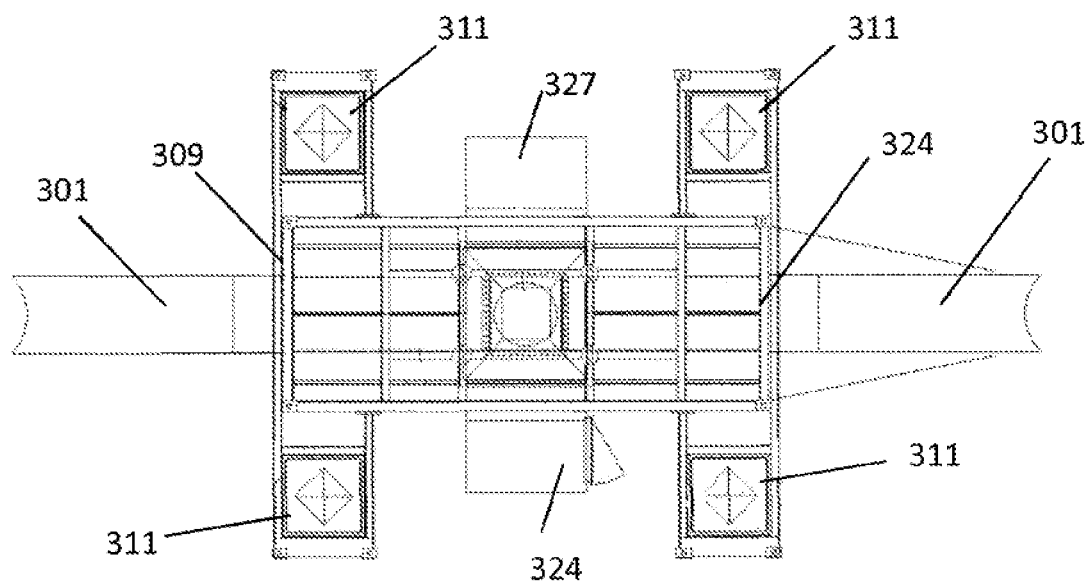
FIG. 26 is a top view of a third embodiment of a submersible habitat for the repair of subsea cable.
Figure 27:
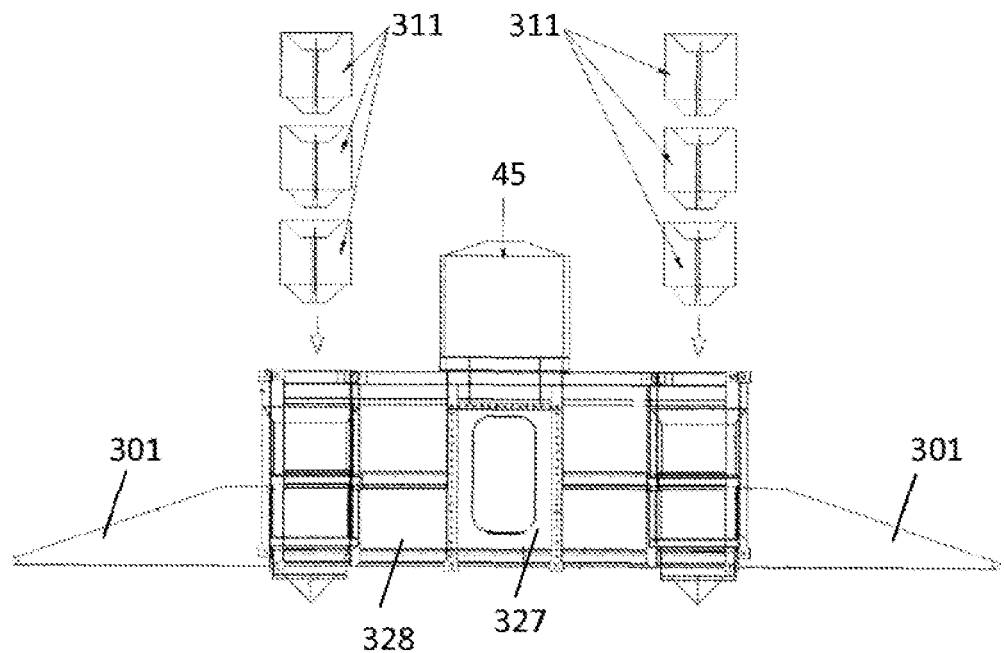
FIG. 27 is a side view of a third embodiment of a submersible habitat for the repair of subsea cable.
Figure 28:
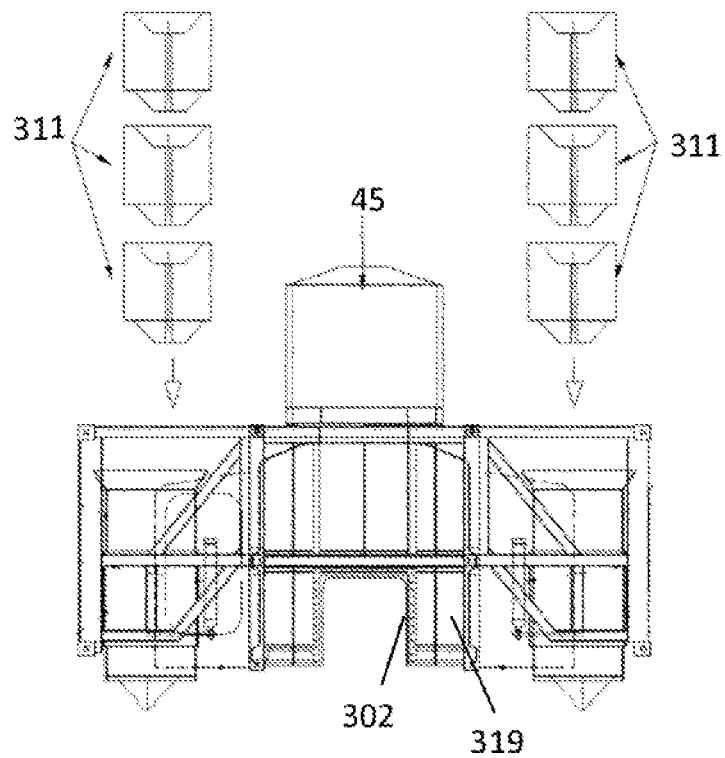
FIG. 28 is a front view of a third embodiment of a submersible habitat for the repair of subsea cable.

An emergency capsule 45 is provided. The emergency capsule 45 can be entered by an operative from the enclosure 18 and provides a habitable environment in the event of an emergency so that the operative may be kept safe until such times as rescue or recovery is possible. As is best illustrated in FIGS. 12 and 17, in some embodiments the emergency capsule 45 is situated on top of the enclosure such that it remains water free at all times.

In use, a method of repairing a subsea cable 11 involves initially placing the submersible habitat 10 in the approximate area of a portion of the subsea cable under repair 13. The location of the submersible habitat 10 is then adjusted from this initial placement position using the components of the location adjustment arrangement 24 such that the habitat 10 is positioned for receiving a portion of the subsea cable under repair 13. The cable is cut by a diver or ROV before the portion of the subsea cable under repair 13 is lifted into the cable maintenance environment 12 by the lifting mechanism 14. The subsea cable 11 may be retained by the clamps 16 prior to cutting of the subsea cable 11 such that axial spreading of the subsea cable 11 does not occur during or after cutting. Either before or after the above operations, the pressurisation arrangement (not shown) creates a water line 22 within the cable maintenance environment 12, the water line having air/gas thereabove above and water therebelow, such that the water line 22 is below the lifted position of the subsea cable 11. At this stage the portion of subsea cable under repair 13 is exposed within an air pocket 15 within the enclosure 18 and can be repaired by an operative located within the enclosure 18.

A second embodiment of the invention is illustrated in FIGS. 12 to 24. In the second embodiment, the apertures 35 in the cable access walls 27 are provided with seal arrangements 101 configured to form a sealable relationship between the enclosure 18 and the subsea cable 11 when the subsea cable 11 is located within the apertures 35. The seal arrangements comprise a seal brackets 102 located on the apertures 35 and a seal member 103 operably engagable with the seal bracket 102 to form a seal therebetween. The seal arrangements are configured such that they may be quickly deployed to form a seal around the subsea cable. Once the submersible habit 100 is placed on the seabed with extensible hydraulic struts 26 located on each side of the subsea cable 11, the raising and lowering component 25 and the lateral movement component 29 are operable independently in sequence, or concurrently in combination to effect final positioning of the submersible habitat 100 which includes laterally positioning the enclosure 18 such that the apertures 35 are located directly above the subsea cable 11. The enclosure is then and lowered such that the subsea cable 11 enters the sealing brackets 102 located within the apertures 35. The structure and operation of the raising and lowering component 25 and the lateral movement component 29 are as described previously in relation to the first embodiment. External cable clamps 104 are located outside the enclosure and are alignable with the apertures 35, each aperture 35 having an external cable clamp 104 located such that the external clamp 104 may hold the subsea cable 11 within the aperture 35, The location of the external cable clamps 104 is such that when the subsea cable 11 is located within the sealing brackets 102 of the apertures 35, the external cable clamps can clamp the subsea cable. Once the location of the enclosure 18 has been adjusted such that the subsea cable 11 is within the sealing brackets 102 and the external cable clamps 104 have clamped the subsea cable 11, one or more operatives located within the habitat 100 will deploy the seal members 103 such that a sealed relationship is formed between the subsea cable 11 and the enclosure 18. The external cable clamps 104 are in close proximity to the seal arrangements 101 such that as the subsea cable 11 is held by the external cable clamps 104, movement of the subsea cable 11 in the vicinity of the seal arrangements 101 is minimised thus enhancing the integrity of the seal arrangements 101. Additionally, internal cable clamps (not shown) may be provided internally of the enclosure 18 proximal to the inner side of the seal arrangements 101. The subsea cable 11 can then be clamped internally at a location proximal the seal arrangements 101 such that movement of the subsea cable 11 internally of the enclosure 18 during repair of the subsea cable 11 does not affect the integrity of the seal arrangements 101.

The enclosure 18 comprises an entrance chamber 105 having a sealable first door 106 for providing access to the interior of the entrance chamber 105 from external of the submersible habitat 100 and a sealable second door 107 for providing access from the entrance chamber 105 to the cable maintenance environment 108 of the enclosure. The second sealable door or 107 may be provided by an existing entrance door of the enclosure. The entrance chamber 105 is pressurised by a compressed/forced air source such as a canister of compressed gas/air (not shown), an air supply from a pack of J-bottles, or a gas/air feed which may be supplied from a support vessel (not shown). The pressurisation arrangement may also utilise multiple air sources. The skilled person would understand that any generally known means for pressurisation could be utilised.

The entrance chamber 105 is a modular entrance chamber and is attachable to the enclosure 18 via a sealable bolted flange 109. In use, operatives may enter the sealable first door 106, seal the sealable first door 106, and remove their diving equipment before entering the cable maintenance environment 108 of the enclosure 18 through the sealable second door 107. This provides a quick and safe method for ingress and egress of the cable maintenance environment 108 of the enclosure 18.

The enclosure 18 of the submersible habitat is formed from a modular construction comprising modular sections 110 joinable to form an enclosure 18 of the desired dimensions. The enclosure 18 is extendible by the addition of modular sections 110 such that its longitudinal length can be adapted to accommodate varying lengths of subsea cable 11 to be repaired. As a result even for longer cable repairs the repair may be carried out entirely within the enclosure 18, with no requirement to transport any portion of the subsea cable 11 to the surface. Each modular section 110 is sized such that it extends the enclosure longitudinally by approximately 1 meter. The modular sections 110 have a generally square cross section having dimensions of approximately 2 meters by 2 meters. The modular sections 110 are attachable between any existing portion of the enclosure 18 and the entrance chamber 105. Both the modular sections 110 and the entrance chamber are attachable to either end 111, 112 of the enclosure 18. It should be noted that the skilled person would understand that various sizes of modular sections could be utilised.

The extendable hydraulic struts 26 terminate in footing pads 116. The footing pad 116 is generally circular. A mud mat may also be provided beneath the pad 116. The diameter of the footing pads 116 and/or the mud mats inhibit the submersible habitat 100 from sinking into the material of the seabed.

In use, the second embodiment of the invention is placed on the seabed such that one set of extendable hydraulic struts 26 are located on each side of the subsea cable 11. Prior to placement, the seabed around the subsea cable 11 is excavated and the portion of seabed on which it is intended to place the submersible habitat 100 is levelled. Operatives 113 then descend to the submersible habitat and enter the entrance chamber 105 via the first sealable door 106. The operatives seal the first sealable door 106 before removing their diving equipment and storing it in the entrance chamber. The operatives then proceed to the cable maintenance environment 108 of the enclosure 18 via the second sealable door wherein they adjust the exact positioning of the submersible habitat 100 laterally and/or vertically via a control module located within the submersible habitat 100 such that the subsea cable 11 is located within the sealing brackets 102. The operatives then proceed to install the seal members in the seal brackets 102 such that a seal is formed between the subsea cable 11 and the enclosure 18. The enclosure 18 may then be pressurised such that the water level therein drops below the level of the portion of cable 115 now suspended within the cable maintenance environment 108. The subsea cable 11 may then be repaired and upon completion of the repair returned to the seabed after removal of the sealing members 103.

A third embodiment of a submersible habitat for subsea cable repair 300 is illustrated in FIGS. 25 to 33. The third embodiment employs channels 301 similar to that as described in relation to the first embodiment. The channels 301, as best viewed in FIG. 33 extend outwards from apertures 302 along the axial direction of the subsea cable 11. The channels 36 are tapered channels which form a sealed attachment around the apertures 302. The channels 301 have a first end 303 with generally the same cross-sectional dimensions as the apertures 302. The channels 301 have a bottom edge 304 which opposes the seabed when in use and extends generally parallel to the seabed and generally perpendicular to the cable access walls 27. The channels 301 have a top face 305 which tapers along the axial length of the channel 301 to meet the bottom edge 304. The bottom faces of the channels 301 are open such that the subsea cable 11 is located within the channels 301 when in use. The channels are sealably attached to the cable access walls. The channels of the third embodiment are provided with subsea cable rollers 306, 307 which act to facilitate movement of the submersible habitat 300 or the subsea cable 11 when the two are in contact and/or to guide/support the subsea cable 11 and make manipulation of the subsea cable easier. A first cable roller 306 is located on the second end 308 of the channel distal the first end 303. A second cable roller 307 is located internal of the submersible habitat 300 at the point where the subsea cable 11 enters the submersible habitat 300 via the channel 301. In use, the submersible habitat 300 would be lowered over the subsea cable 11 from a vessel by a hoist cable 330 such that the subsea cable 11 enters the channels 301 on either side of the enclosure 319. The subsea cable 11 is then cut and one end thereof is lifted to the roof of the enclosure 319, the lifting typically carried out by a hoist (not shown). The second cable roller 307 is then inserted beneath the raised subsea cable 11 and the subsea cable 11 is lowered, the second cable roller 307 retaining the subsea cable 11 at a work level sufficient for joint preparation.

As in the first embodiment, channels 301 are located on either opposing side 309, 310 of the submersible habitat. The channels 301 would typically be attached to the submersible habitat 300 before submersion. One advantage of utilising channels 301 over seals 102, 103 as employed in the second embodiment, is that movement of the subsea cable 11 may cause failure of the seals 102, 103. Movement of the subsea cable 11 within the channels 301 is not critical in the same manner. In addition, the channels 301 of the third embodiment result in minimal requirement to lift the subsea cable 11 at any stage. The cable is undermined by excavation of the seabed and the submersible habitat 300 is placed on top of the undermined subsea cable 11 providing access thereto for any repair work with minimal lifting. This method is safer and prevents further damage to the subsea cable 11 during a lifting or lowering process, whilst clearly identifying a fault with the subsea cable 11 in situ.

Figure 29:
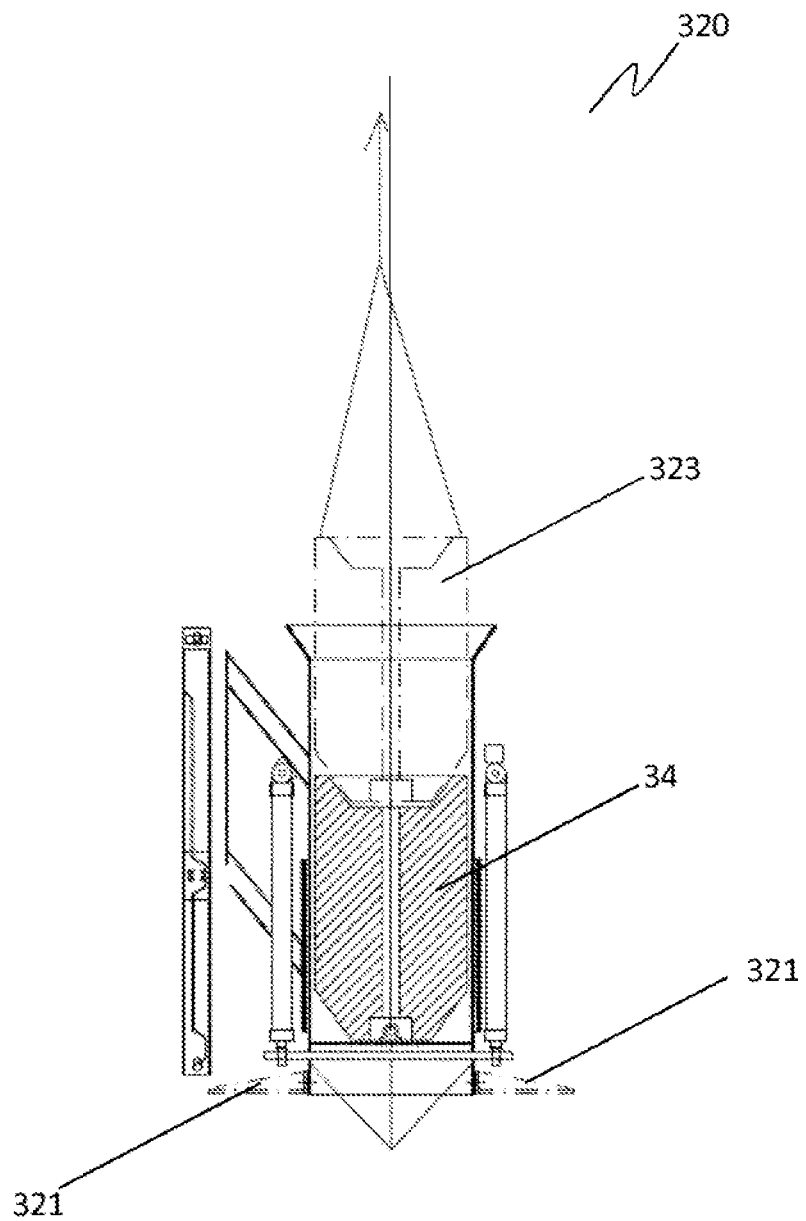
FIG. 29 is a sectional view of a leg arrangement of a third embodiment of a submersible habitat for the repair of subsea cable, the leg arrangement being in a lowered position.
Figure 30:
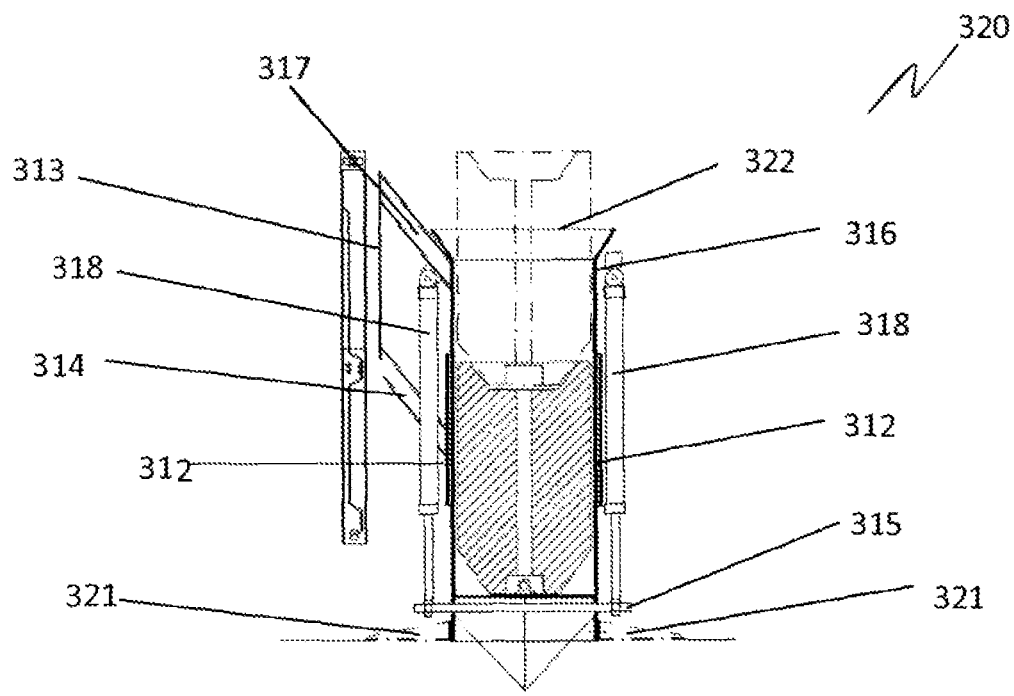
FIG. 30 is a sectional view of a leg arrangement of a third embodiment of a submersible habitat for the repair of subsea cable, the leg arrangement being in a raised position.

The third embodiment also comprises a raising and lowering component which differs from that disclosed in the first and second embodiments. As is best seen in FIGS. 29 and 30, in the third embodiment the submersible habitat 300 comprises leg arrangements 320 having a leg guide 312 fixably attached to the side wall 313 of the submersible habitat via a guide strut 314. The leg arrangements 320 further comprise an extensible leg component having a lower ground engaging member 315 and an upper member 316 which is fixably attached to the side wall of the submersible habitat 300 via a strut 317. Extensible hydraulic cylinders 318 are operably engagable between the lower ground engaging member 315 and the upper member 316 or strut 317 such that extension of the hydraulic cylinders causes upwards vertical movement of the upper member 316 and thus relative vertical movement between the lower ground engaging member 315 and the upper member 316, in turn causing the enclosure 319 of the submersible habitat 300 to rise when the lower ground engaging member 315 is in contact with the seabed. Both the lower ground engaging member 315 and the upper member 316 are hollow members defining hollow internal spaces. The lower ground engaging member 315 is of similar cross-sectional shape to the upper member 316, but has a slightly smaller cross sectional area such that it is slidable within the hollow internal space of the upper member 316. The leg guide extends at least partially around the upper section 316 such that movement of the upper section is guided thereby. The leg arrangements 320 may further comprise a mud skirt 321 bolted to the base portion of the leg arrangements 320 such that the mud skirts 321 prevent the leg arrangements 320 from sinking into the seabed.

Ballast is located in ballast pigs 311. The ballast pigs located within the lower ground engaging members 315 of the leg arrangements 320. The ballast pigs are insertable into an upper opening 322 in the lower ground engaging members 315, into the hollow internal space thereof. The ballast counteracts the buoyancy effect on the submersible habitat 300 when it becomes dewatered/pressurised. As the ballast pigs are located within the lower ground engaging members 315, the extensible hydraulic cylinders 318, when actuated do not lift the ballast as they act to raise the upper member 316. This reduces the amount of lifting power required as only the remainder of the submersible habitat 300 excluding the ballast must be lifted. In certain high energy conditions, additional ballast 323 may be employed which is also accepted into the lower ground engaging members 315. The ballast is typically lead ballast weights. The submersible habitat wall sections are manufactured from steel having a thickness which minimises the ballast weight requirements and thus the size of vessel required to deploy. The thickness of steel and the weight of the ballast may be varied depending on factors such as the depth of deployment, the weather, subsea conditions/forces, or any other factor which may affect the stability or operational conditions of the submersible habitat during use. The ballast is lowered by cable from a vessel on the surface of the water after the submersible habitat 300 has been placed on the seabed and before the submersible habitat 300 has been dewatered/pressurised.

The third embodiment employs an access chamber 324 located on the side 325 of the submersible habitat 300. Divers enter the access chamber 324 via door 326 and store diving equipment before entering the main enclosure of the submersible habitat. A tool store 327 is also locatable on the opposing side of the habitat 328 from the access chamber 324. The tool store 327 provides dry storage for electronic tools, equipment, jointing kits, first aid boxes, or any other items which require dry storage. The location of the tool store 327 on the opposing side 328 from the access chamber 324 helps to balance the submersible habitat 300.

In use, the first phase of placing the submersible habitat 300 over the subsea cable 11 on the seabed, placing ballast weights, dewatering, cutting the subsea cable 11 and fault testing the subsea cable 11 will all be completed using remotely operated vehicle (ROV) or Robotics. The remainder of the jointing works carried out on the subsea cable 11 will be completed using a combination of divers and robotics supervised by senior joint specialist operatives in a control room on deck of a vessel.

Figure 31:
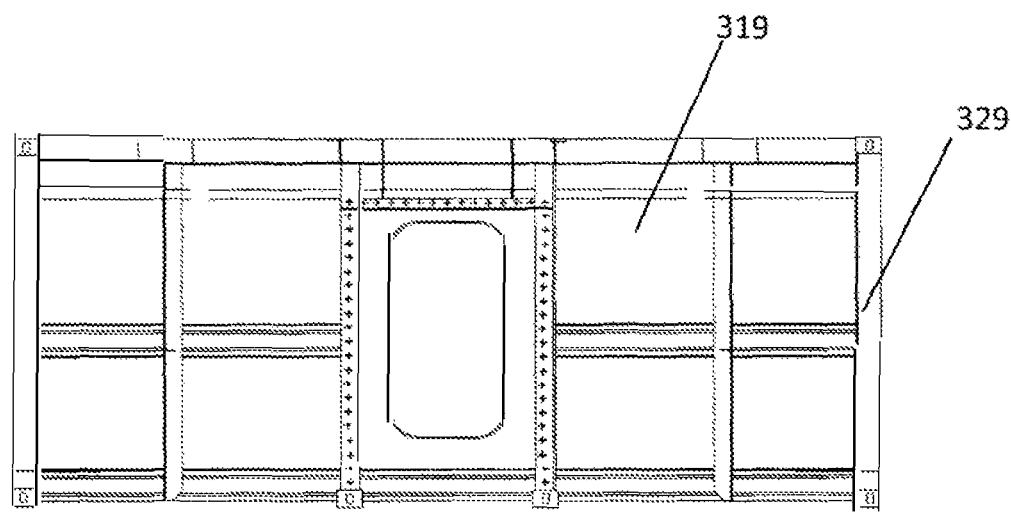
FIG. 31 is a side view of the enclosure of a submersible habitat for the repair of subsea cable located within a first transport container.
Figure 32:
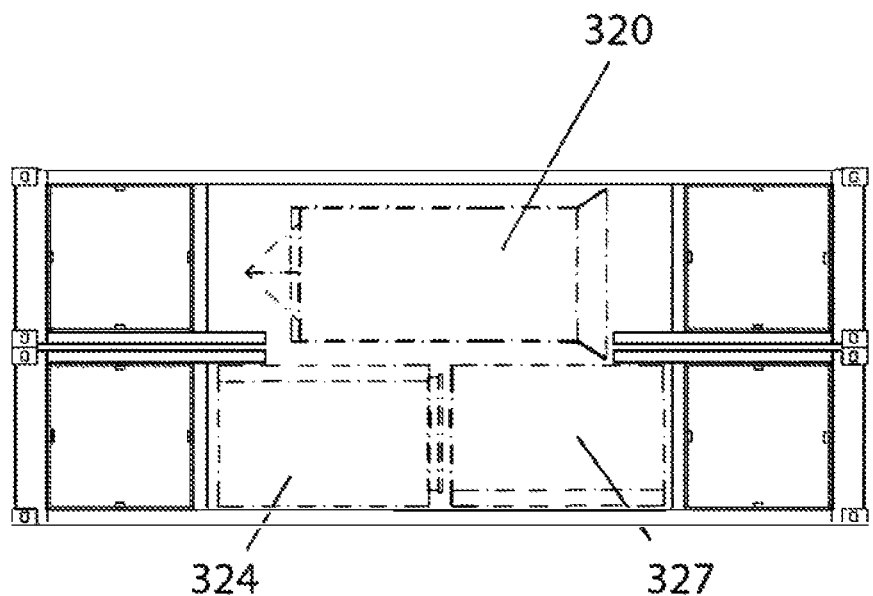
FIG. 32 is a side view of the leg arrangements, access chamber, and tool store of a third embodiment of a submersible habitat for the repair of subsea cable located within a second transport container.
Figure 33:
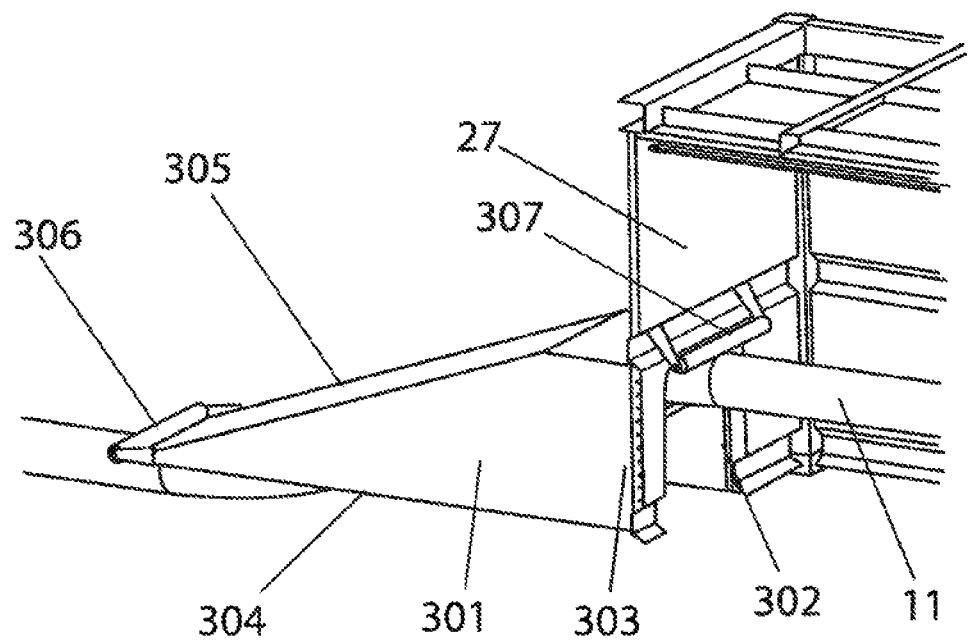
FIG. 33 is a sectional perspective view of a channel of a third embodiment of a submersible habitat for the repair of subsea cable.

The submersible habitat is stowable within two standard ISO 20 foot transport containers and as such is easily transportable when not in use. FIGS. 31 and 32 show an example configuration of the submersible habitat in a partially disassembled state within two transport containers. FIG. 31 shows a first transport container 329 housing the enclosure 319 of the submersible habitat 300. FIG. 32 shows a second transport container housing the access chamber 324, leg arrangements 320, and tool store 327.

The submersible habitat 300 comprises systems for management of excess heat, excess and/or toxic gases. Gases may be managed by extraction from the enclosure to the surface via piping or the like. An extractor fan may be employed to forcibly extract air and/or gases from the interior of the enclosure. Alternatively, a filter or gas neutralisation system may be employed to neutralise the gas or filter harmful constituents thereof. The submersible habitat 300 may also employ a double skin construction or a layer of insulation in order to deal with condensation build-up within the enclosure 319. Condensation may also be dealt with within the enclosure by providing shaped ceiling or wall features which encourage any condensation to travel along ceiling and wall portions such that it is directed away from work areas or is prevented from dripping on work areas.

It should be understood that particular embodiments described above are examples only and that features of one embodiment may be added to or replace the features of another embodiment. For example, the channels of some embodiments may be interchanged with the seals of other embodiments, all embodiments may employ continuous tracks for movement along the subsea cable, all embodiments may employ cable clamps internally or externally of the enclosure, and the emergency capsule, tool storage, and access chamber may be located in any position as described in any embodiment.

It should be understood that the invention, whilst described as suitable for repair of subsea cable, can equally be utilised to repair subsea piping, conduit, or any other such subsea infrastructure.

The invention is not limited to the embodiment(s) described herein but can be amended or modified without departing from the scope of the present invention.

The invention claimed is:

1. A submersible habitat for the repair of subsea cable, the habitat comprising:
   a cable maintenance environment suitable for receiving a portion of the subsea cable under repair while the subsea cable is submerged, wherein the cable maintenance environment is at least partially enclosed by an enclosure;
   wherein the entire repair is carried out within the submersible habitat without the requirement to transport any portion of the subsea cable to the surface, the submersible habitat further comprising raising and/or lowering means configured for raising and/or lowering the submersible habitat relative to the subsea cable; and
   wherein the enclosure comprises an entrance chamber further comprises a sealable first door or hatch for providing access to the interior of the entrance chamber from external of the submersible habitat, and a sealable second door or hatch for providing access from the entrance chamber to the cable maintenance environment of the enclosure.

2. A submersible habitat according to claim 1, wherein the enclosure is suitable for housing at least one human inhabitant and at least the portion of subsea cable under repair.

3. A submersible habitat according to claim 1, further comprising a location adjustment means in operable engagement with the enclosure and arranged to adjust the location of the enclosure and/or lifting mechanism relative to the subsea cable.

4. A submersible habitat according to claim 3, wherein the location adjustment means allows for adjustment of the location of the enclosure relative to the subsea cable after initial placement of the habitat on a seabed such that the subsea cable is locatable within the enclosure and is accessible within the cable maintenance environment.

5. A submersible habitat according to claim 3 wherein the location adjustment means is arranged to adjust the location of the enclosure after the submersible habitat has been placed on an area of seabed proximal the subsea cable, the placement being laterally and/or longitudinally offset from the subsea cable or a site of subsea cable repair.

6. A submersible habitat according to claim 3 wherein the location adjustment means comprises raising and/or lowering means arranged to adjust the location of the enclosure such that the enclosure is raisable into an elevated position relative to the subsea cable, and/or lowerable from an elevated position relative to the subsea cable to a position on or proximal the seabed.

7. A submersible habitat according to claim 3 wherein the location adjustment means comprises lateral movement means arranged to adjust the location of the enclosure such that the enclosure is moveable laterally relative to the subsea cable.

8. A submersible habitat according to claim 3, wherein the raising and/or lowering means and the lateral movement means are operable independently in sequence, or concurrently in combination, to raise the enclosure into an elevated position relative to the subsea cable, laterally position the enclosure such that at least a portion of the enclosure is locatable directly above at least a portion of the subsea cable, and lower the enclosure such that at least a portion of the subsea cable may be locatable within the cable maintenance environment.

9. A submersible habitat according to claim 6 wherein the raising and/or lowering means comprises a plurality of extensible supports in operable engagement with the enclosure and arranged to selectably raise or lower the enclosure relative to the subsea cable.

10. A submersible habitat according to claim 6 wherein the raising and/or lowering means comprises at least one, and preferably two, opposing sets of extensible supports locatable on each side of the enclosure and operably engagable with the enclosure such that extension or retraction of the extensible supports raises or lowers the enclosure.

11. A submersible habitat according to claim 9 wherein the extensible support(s) are locatable laterally on each side of the subsea cable upon initial placement of the submersible habitat.

12. A submersible habitat according to claim 7 wherein the lateral movement means comprises at least one enclosure guide means in operable engagement with the enclosure to guide the lateral movement of the enclosure, the enclosure guide means extending generally perpendicular to the longitudinal direction of the subsea cable and between opposing raising and/or lowering means, the lateral movement means further comprising a means for conveying the enclosure along the at least one enclosure guide means.

13. A submersible habitat according to claim 12 wherein the lateral movement means comprises two enclosure guide means, one extending between each set of opposable raising/lowering means, each enclosure guide means being in operable engagement with a subsea cable facing outer face of the enclosure and having means for conveying the enclosure arranged therebetween to convey the enclosure along the enclosure guide means.

14. A submersible habitat according to claim 12 wherein the enclosure guide means is at least one track, the enclosure having track engagement means for slidable or other such movable engagement with the at least one track such that the enclosure is movable along the at least one track generally in the longitudinal direction of the at least one track, and the means for conveying the enclosure is a hydraulic actuation means or other such suitable actuation means.

15. A submersible habitat according to claim 3 wherein the location adjustment means comprises longitudinal movement means.

16. A submersible habitat according to claim 15 wherein the longitudinal movement means comprises one or more continuous track, wheels, a thruster system, or other such means arranged to convey the submersible habitat in the longitudinal direction of the subsea cable.

17. A submersible habitat according to claim 1, wherein the enclosure comprises cable access means.

18. A submersible habitat according to claim 17 wherein the enclosure has opposable cable access walls through which the cable is passable, the cable access means comprising apertures in the cable access walls of the enclosure, the subsea cable being locatable in the apertures.

19. A submersible habitat according to claim 18 wherein the apertures are elongated apertures which extend from the bottommost edge of the opposable cable access walls in a generally vertical direction part way along the cable access walls, the elongated apertures being configured to permit at least partial vertical movement of the subsea cable.

20. A submersible habitat according to claim 18 wherein the cable access means comprise channels which extend outwards from the apertures of the cable access means generally along the axial direction of the subsea cable.

21. A submersible habitat according to claim 20 wherein the channels are sealably attachable around at least a portion of the apertures of the cable access means.

22. A submersible habitat according to claim 20 wherein the channels are tapered channels having a first end with generally the same cross-sectional dimensions as at least an upper portion of the elongated openings, a bottom edge which opposes the seabed when in use and extends generally parallel to the seabed, and a top face which tapers along the axial length of the channel to meet the bottom edge.

23. A submersible habitat according to claim 20 wherein the bottom faces of the channels are open such that the subsea cable is locatable within the channels.

24. A submersible habitat according to claim 17 wherein the cable access means are provided with seal means configured to form a sealable relationship between the enclosure and the subsea cable when the subsea cable is located within the cable access means.

25. A submersible habitat according to claim 24 wherein the seal means are adjustable seal means comprising a seal bracket locatable on the cable access means and a seal member operably engagable with the seal bracket to form a seal therebetween.

26. A submersible habitat according to claim 17 wherein external cable retention components are locatable outside the enclosure, the external cable retention components being alignable with the cable access means, each cable access means having an external cable retention component alignable therewith such that when the subsea cable is located within the sealing brackets of the cable access means, the external cable retention components can retain the subsea cable.

27. A submersible habitat according to claim 24 wherein the external cable retention components are in close proximity to the cable access means and associated seal means such that movement of the subsea cable in the vicinity of the seal means is minimised thus enhancing the integrity of the seal means.

28. A submersible habitat according to claim 1, wherein internal cable retention components are provided internally of the enclosure, the internal cable retention components being locatable proximal the cable access means such that movement of the subsea cable internally of the enclosure during repair of the subsea cable does not affect the integrity of the seal means.

29. A submersible habitat according to claim 1, wherein at least a portion of at least the enclosure of the submersible habitat is formed from a modular construction comprising modular sections joinable to form an enclosure of desired dimensions such that the longitudinal length of the enclosure can be adapted.

30. A submersible habitat for the repair of subsea cable, the habitat comprising:
a cable maintenance environment suitable for receiving a portion of the subsea cable under repair while the subsea cable is submerged, wherein the cable maintenance environment is at least partially enclosed by an enclosure;
wherein the entire repair is carried out within the submersible habitat without the requirement to transport any portion of the subsea cable to the surface, the submersible habitat further comprising raising and/or lowering means configured for raising and/or lowering the submersible habitat relative to the subsea cable; and
wherein the enclosure comprises four side walls and a roof portion connecting the four side walls, the bottom portion of the enclosure opposing the roof portion is an open portion such that the enclosure is in fluid communication with the water when the submersible habitat is submerged.

31. A submersible habitat according to claim 1, wherein the enclosure has pressurisation means operable to create an air pocket within the cable maintenance environment.

32. A submersible habitat according to claim 31 wherein the pressurisation means is operable to evacuate water from, or prevent water from entering, the open portion of the enclosure by forcing air/gas into the enclosure, such that a water line is formed within the enclosure having water therebelow and air/gas thereabove.

33. A submersible habitat according to claim 31 wherein the pressurisation means maintains the pressure within the enclosure such that the water level therein remains at a desired level.

34. A submersible habitat according to claim 31 wherein the pressurisation means comprises a gas/air supply, or a gas/air tank.

35. A submersible habitat according to claim 1 wherein the subsea cable is a subsea power cable.

36. A submersible habitat according to claim 1, wherein a lifting mechanism lifts the subsea cable such that some or all of the portion of the subsea cable under repair is not submerged.

37. A submersible habitat according to claim 1, wherein the habitat comprises subsea cable retaining means arranged to engage with and retain the subsea cable.

38. A submersible habitat according to claim 37, wherein the subsea cable retaining means are locatable on the lifting mechanism.

39. A submersible habitat according to claim 37, wherein the subsea cable retaining means comprise at least one, and preferably two, retaining elements for releasably retaining the subsea cable.

40. A submersible habitat according to claim 39, wherein the lifting mechanism comprises at least one extensible arm, the extensible arm terminating at a first end in the retaining element.

41. A submersible habitat according to claim 39, wherein the lifting mechanism comprises two extensible arms, each extensible arm terminating at a first end in a retaining element, the retaining elements being arranged to engage with and retain the subsea cable at two separate retained locations longitudinally along the subsea cable, the portion of subsea cable under repair being disposed between the two retained locations.

42. A submersible habitat according to claim 36 wherein the subsea cable retaining means is arranged to retain the subsea cable such that upon cutting of the subsea cable the subsea cable retaining means reduces or prevents axial spreading of the cut portion or portions of the subsea cable.

43. A submersible habitat according to claim 36, wherein the lifting mechanism and the subsea cable retaining means in combination are configured to grab the subsea cable from its position on the seabed, raise the subsea cable into the lifted position, and retain the subsea cable in the lifted position such that a repair can be carried out.

44. A submersible habitat according to claim 1 comprising cable rollers which are configured to guide and/or support the subsea cable.

45. A submersible habitat according to claim 44, wherein at least one cable roller is insertable beneath the subsea cable when the subsea cable is located within the cable maintenance environment, the at least one cable roller retaining the subsea cable at a work level sufficient for joint preparation.

46. A submersible habitat according to claim 6, wherein the raising and/or lowering means comprises leg arrangements comprising an extensible leg component having a lower ground engaging member and an upper member which is fixably attached to a side wall of the submersible habitat, the lower ground engaging member and upper member being movable relative to each other.

47. A submersible habitat according to claim 45, wherein at least one actuator is operable between the lower ground engaging member and upper member and configured to effect relative movement therebetween by raising the upper member.

48. A submersible habitat according to claim 45 wherein the lower ground engaging member and the upper member are hollow members defining hollow internal spaces.

49. A submersible habitat according to claim 45, wherein the leg arrangements further comprise a leg guide fixably attached to the side wall of the submersible habitat and configured to guide the relative movement between the lower ground engaging member and upper member.

50. A submersible habitat according to claim 45, wherein ballast is located in ballast pigs, the ballast pigs being locatable within the leg arrangements.

51. A submersible habitat according to claim 50, wherein the ballast is located within the hollow internal space of the lower ground engaging member.

52. A method of repairing a cable, the method comprising;
locating a portion of the subsea cable under repair over a cable maintenance environment while the subsea cable is submerged;
adjusting the height of the cable maintenance environment; and
lifting the portion of the subsea cable such that the portion of the subsea cable under repair is raised to a lifted position within the cable maintenance environment.

53. A method of repairing a cable according to claim 52 wherein the method comprises creating a water line within the cable maintenance environment, the water line having air/gas thereabove above and water therebelow, such that the water line is below the lifted position of the subsea cable.

54. A method of repairing a cable according to claim 52 wherein the method comprises retaining the subsea cable prior to cutting of the subsea cable such that axial spreading of the subsea cable does not occur during or after cutting.

55. A method of repairing a cable according to claim 52 wherein the method comprises initial placement of the submersible habitat at or about a portion of the subsea cable under repair.

56. A method of repairing a cable according to claim 55 wherein the method comprises adjusting of the submersible habitat from its initial placement position such that it is positioned for receiving a portion of the subsea cable under repair.

57. A method of repairing a cable according to claim 52 wherein the subsea cable is a subsea power cable.

58. A method of repairing a cable according to claim 52 further comprising excavating the seabed around at least the portion of subsea cable to be repaired.

59. A method of repairing a cable according to claim 52 further comprising levelling the seabed at least at the intended point of placement of the submersible habitat thereon.

\* \* \* \* \*

UNITED STATES PATENT AND TRADEMARK OFFICE
CERTIFICATE OF CORRECTION

PATENT NO. : 11,565,780 B2
APPLICATION NO. : 16/645151
DATED : January 31, 2023
INVENTOR(S) : David Kinsella and Michael Kinsella It is certified that error appears in the above-identified patent and that said Letters Patent is hereby corrected as shown below:

On the Title Page

Column 1, On Line (72) Delete "(IR)" and Insert --(IE)-- for inventor David Kinsella's residence country Signed and Sealed this
Twenty-fifth Day of June, 2024

Katherine Kelly Vidal
*Director of the United States Patent and Trademark Office*